United States Patent
Blaine et al.

(10) Patent No.: US 9,830,187 B1
(45) Date of Patent: Nov. 28, 2017

(54) SCHEDULER AND CPU PERFORMANCE CONTROLLER COOPERATION

(71) Applicant: Apple Inc., Cupertino, CA (US)

(72) Inventors: Russell A. Blaine, San Carlos, CA (US); Daniel A. Chimene, San Francisco, CA (US); Shantonu Sen, Cupertino, CA (US); John Dorsey, San Francisco, CA (US); Bryan Hinch, Mountain View, CA (US); Cyril De La Cropte De Chanterac, San Francisco, CA (US); Olivier Cozelle, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/732,266

(22) Filed: Jun. 5, 2015

(51) Int. Cl.
  *G06F 9/46* (2006.01)
  *G06F 9/48* (2006.01)
  *G06F 9/50* (2006.01)
  *G06F 9/52* (2006.01)

(52) U.S. Cl.
  CPC .......... *G06F 9/4843* (2013.01); *G06F 9/4881* (2013.01); *G06F 9/4893* (2013.01); *G06F 9/5027* (2013.01); *G06F 9/5094* (2013.01); *G06F 9/52* (2013.01)

(58) Field of Classification Search
  CPC ................................. G06F 9/52; G06F 9/4881
  USPC .................................................. 718/102, 104
  See application file for complete search history.

(56) References Cited

U.S. PATENT DOCUMENTS

| | | | | |
|---|---|---|---|---|
| 5,345,567 A | * | 9/1994 | Hayden | G06F 9/30094 712/228 |
| 5,738,860 A | * | 4/1998 | Sch.o slashed.nfeldt | A61F 13/00063 424/402 |
| 5,812,844 A | * | 9/1998 | Jones | G06F 9/4887 718/100 |
| 5,974,438 A | * | 10/1999 | Neufeld | G06F 9/4881 711/144 |
| 6,021,425 A | * | 2/2000 | Waldron, III | G06F 9/4881 718/103 |

(Continued)

OTHER PUBLICATIONS

Nakajima et al, "Temporal and Spatial Isolation in a Virtuallization Layer for Multi-core processor based Information Appliances", 2011.*

(Continued)

*Primary Examiner* — Phillip H Nguyen
(74) *Attorney, Agent, or Firm* — Blakely, Sokoloff, Taylor & Zafman LLP

(57) ABSTRACT

In one embodiment, an application programming interface (API) is defined that enables a thread scheduler to communicate thread information to the CPU performance controller when dispatching a thread to a processor or processor core. When dispatching a thread, the scheduler may communicate thread information including thread state information, a general "importance" of the thread as defined by a priority level and/or quality of service (QoS) classification, a measurement of the scheduler dispatch latency for the thread, or architectural information regarding the instructions within the thread, such as whether the thread is contains 64-bit or 32-bit instructions. The performance controller can use the information provided by the scheduler to make performance control decisions for the processor cores within the system.

43 Claims, 13 Drawing Sheets

(56) References Cited

U.S. PATENT DOCUMENTS

| | | | |
|---|---|---|---|
| 8,516,461 B2 | 8/2013 | Bellows et al. | |
| 8,707,314 B2 | 4/2014 | Gummaraju et al. | |
| 8,738,860 B1* | 5/2014 | Griffin | G06F 12/0897 |
| | | | 711/122 |
| 8,892,931 B2* | 11/2014 | Kruglick | 711/211 |
| 9,286,116 B2* | 3/2016 | Wang | G06F 9/4856 |
| 2003/0088610 A1* | 5/2003 | Kohn | G06F 1/3203 |
| | | | 718/107 |
| 2007/0294694 A1* | 12/2007 | Jeter | G06F 9/30123 |
| | | | 718/102 |
| 2008/0163183 A1* | 7/2008 | Li | G06F 8/456 |
| | | | 717/149 |
| 2009/0144744 A1* | 6/2009 | Gunnels | G06F 9/4881 |
| | | | 718/105 |
| 2011/0296407 A1* | 12/2011 | Bhandari | G06F 9/455 |
| | | | 718/1 |
| 2012/0315966 A1* | 12/2012 | Spata | G06F 9/4881 |
| | | | 463/1 |
| 2014/0013330 A1 | 1/2014 | Wang et al. | |
| 2014/0237477 A1* | 8/2014 | Cadambi | G06F 9/5044 |
| | | | 718/103 |
| 2014/0282507 A1* | 9/2014 | Plondke | G06F 9/45545 |
| | | | 718/1 |
| 2014/0310467 A1* | 10/2014 | Shalf | G06F 15/7825 |
| | | | 711/119 |
| 2015/0073920 A1* | 3/2015 | Pashkevich | H04W 4/206 |
| | | | 705/14.71 |
| 2015/0113542 A1* | 4/2015 | Cadambi | G06F 9/52 |
| | | | 718/107 |
| 2016/0225042 A1* | 8/2016 | Tran | H04L 43/0852 |

OTHER PUBLICATIONS

Krasic et al., "Fair and Timely Scheduling via Cooperative Polling", 2009.*

Rajagopalan et al., "Thread Scheduling for Multi-Core Platforms", 2007.*

Masakatsu Nakai et al., "Dynamic Voltage and Frequency Management for a Low-Power Embedded Microprocessor", ICCC Journal of Solid-State Circuits, vol. 40, No. 1, © Jan. 2005, 8 pages.

* cited by examiner

SCHEDULER AND CPU PERFORMANCE CONTROLLER COOPERATION

BACKGROUND OF THE DISCLOSURE

Processors may use performance control logic to dynamically vary the frequency and voltage of a processor or processor core based on the computational demands placed on the processor. This can be particularly of use in battery-operated systems where minimizing power consumption is important for enabling extended use. In general, performance control logic operates by monitoring the operational state of the processor and dynamically adjusting the voltage and clock frequency of the processor to provide increased performance under high computational loads and reduced power consumption under minimal load or idle conditions. While performance control logic known in the art is generally reactive to the operational state of the processor, some implementations of performance control logic attempt to make predictions on the future operational demands of the processor. However, those predictions may not be accurate under all circumstances.

SUMMARY OF THE DESCRIPTION

Various embodiments are described in which scheduler and performance control logic within a data processing system or electronic device perform cooperative operations in a closed loop manner to perform a runtime determination of an amount of execution resources to use when scheduling threads for execution.

One embodiment provides for a method comprising receiving a first application programming interface (API) call from a scheduler indicating that the scheduler is to execute a thread on the one or more processor cores, the first API call including dispatch latency for a thread; computing a first control effort based on a difference between the dispatch latency for the thread and a target dispatch latency; determining the set of recommended processor cores using the control effort; and communicating the set of recommended processor cores to the scheduler. The set of recommended processor cores can be selected from the one or more processor cores of the one or more processors, where a count of processor cores in the set of recommended processor cores is determined at least in part using the first control effort.

In one embodiment, a data processing system includes one or more processors including one or more processor cores, a scheduler to execute on at least one of the one or more processors, and performance control logic. The scheduler can schedule a thread for execution on a processor core of the one or more processors. The performance control logic can compute a first control effort based on a dispatch latency received from the scheduler. Based on the control effort, the performance control logic can be configured to determine a set of recommended processor cores and communicate the set of recommended processor cores to the scheduler.

Other embodiments include corresponding electronic devices and computing processes configured to perform operations of the system described. In one embodiment, a non-transitory machine-readable medium stores instructions which, when executed by one or more processors including one or more processor cores, cause the one or more processors to perform operations to determine a set of recommended processor cores. In various embodiments, the operations comprise receiving a first application programming interface (API) call from a scheduler indicating that the scheduler is to execute a thread on the one or more processor cores, the first API call including dispatch latency for a thread. The operations further comprise computing a first control effort based on a difference between the dispatch latency for the thread and a target dispatch latency and determining the set of recommended processor cores using the control effort. The set of recommended processor cores can be selected from the one or more processor cores of the one or more processors, where a count of processor cores in the set of recommended processor cores is determined at least in part using the first control effort.

In one embodiment, an electronic device includes one or more processors having a first and second set of processor cores. The electronic device can include a scheduler to execute on the one or more processors, where the scheduler is configured to cause a thread to execute on a processor core in the first or second set of processor cores. The electronic device can also include performance control logic to configure a power and performance state of the one or more processors and further to compute a first control effort based on a dispatch latency received from the scheduler, compute a second control effort based on a processor performance metric received from the one or more processors, determine a set of recommended processor cores based on the first and second control effort, and communicate the set of recommended processor cores to the scheduler.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Figure 1:
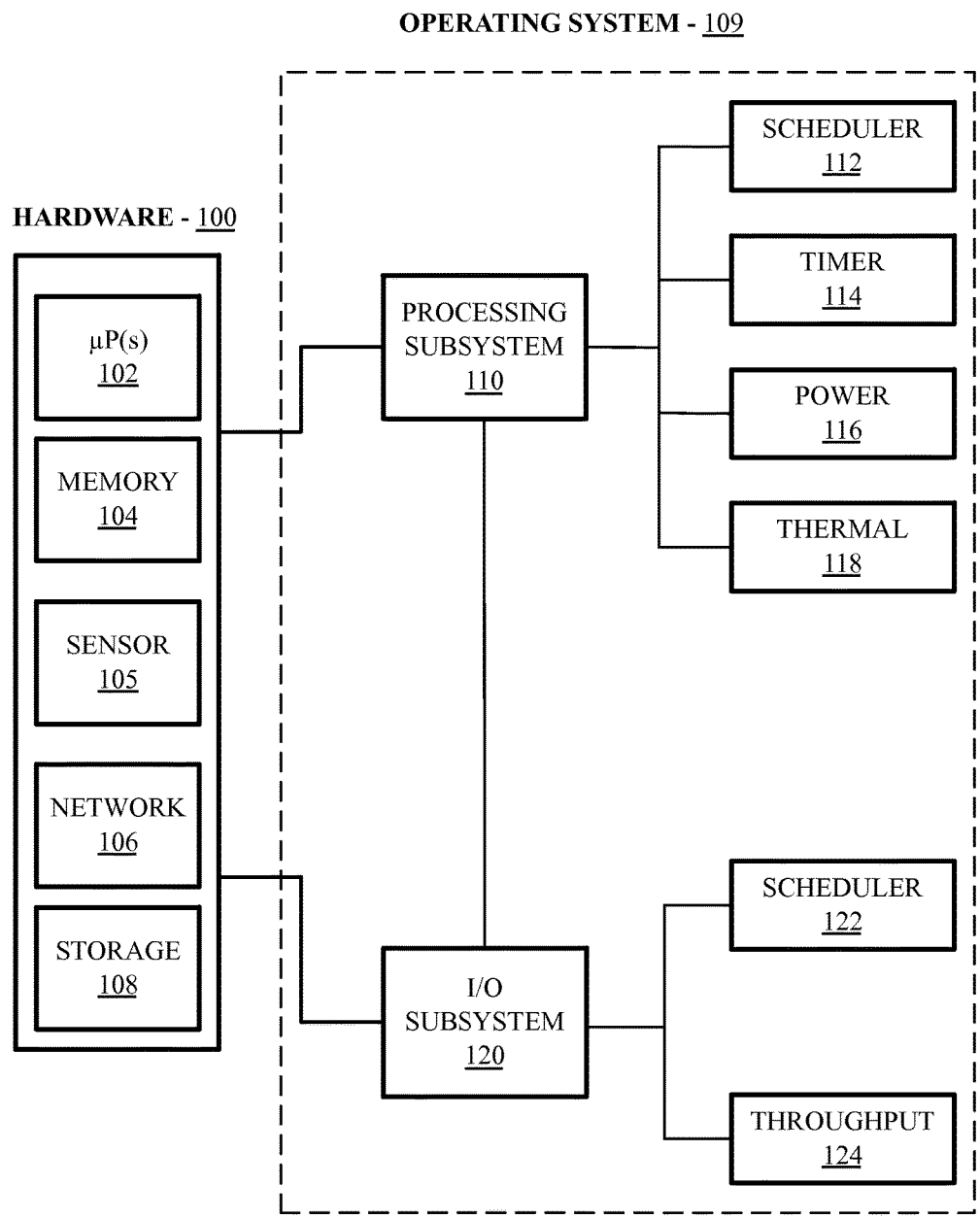
FIG. 1 is a block diagram of hardware and operating system software components of a data processing system, according to embodiments.

Described herein is a system and method of scheduler and CPU performance controller cooperation that enables bidirectional communication between processor performance control logic and a thread scheduler for the processor. The scheduler can be configured to notify the performance controller of various characteristics of a thread as the thread is placed onto a given processor core. In turn, the performance control logic can be configured to communicate feedback to the scheduler to enable the scheduler to refine scheduling decisions made for subsequent threads, including presenting a set of recommended processors to use when scheduling subsequent threads.

In one embodiment, an application programming interface (API) is defined that enables a thread scheduler to communicate thread information to the performance controller when dispatching a thread to a processor or processor core. When dispatching a thread, the scheduler may communicate thread information including thread state information, a general "importance" of the thread as defined by a priority level and/or quality of service (QoS) classification, a measurement of the scheduler dispatch latency for the thread, or architectural information regarding the instructions within the thread, such as whether the thread contains 64-bit or 32-bit instructions, or instructions that make use of a specific architectural feature.

The performance controller can use the information provided by the scheduler to make performance control decisions for the processor cores within the system. For example, the performance controller can enable or disable processor cores based on the thread scheduler dispatch latency, so that if the scheduler is reporting that the latency between receiving a thread dispatch request and dispatching the thread to a processor core is particularly high (e.g., exceeds a target latency), the performance controller will increase the number of recommended processor cores. The scheduler can then begin to schedule threads to the additional processors that are made available by the performance controller.

In one embodiment, the scheduler and CPU performance controller are utilized in an asymmetric multiprocessing system including multiple sets of processor cores having differing performance and power characteristics. The processor cores can include a first and second set of processor cores, where the first set of processor cores have higher performance relative to the second set of processor cores, and the second set of processor cores have reduced energy consumption relative to the first set of processor cores. In one embodiment, the performance differential is due to differing operational frequencies between the processors in the differing sets. However, the processor cores may also include additional differences. In such embodiment, the scheduler and performance controller may communicate to determine whether individual threads are to be dispatched to either of the higher performance or higher efficiency processor cores, and whether a particular set of processor cores is available to receive threads.

For example, under some circumstances (e.g., low battery level) the performance controller may determine that none of the higher performance processor cores will be made available to schedule threads so as to maintain a low level of power consumption. In such circumstances, the performance controller will not include any of the higher performance processor cores in the set of recommended processor cores. Under some circumstances, the performance controller may determine that overall system responsiveness may benefit from making additional processor cores, including high performance processor cores, available to the scheduler. In such circumstance, the performance controller will recommend that the scheduler use a large number of processor cores to schedule threads, and that at least some of the threads may be eligible to be scheduled on the high performance processor core. Not all threads may be eligible to be scheduled on a high performance processor core and the performance controller may make such determinations based on the general importance of the thread, as determined by the priority level and/or QoS classification for the thread that was communicated to the performance controller by the scheduler.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. Moreover, specific details of embodiments are illustrated in detail in certain figures, but in differing detail in others. One having ordinary skill in the art will understand that details shown and/or illustrated for one embodiment may be combined with details shown and/or illustrated for other, similar embodiments. In certain instances, well-known or conventional details are not described in order to provide a concise discussion of various embodiments of the present invention.

The processes depicted in the figures that follow are performed by processing logic that comprises hardware (e.g. circuitry, dedicated logic), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

Subsystem Overview and Thread Importance Classification

FIG. 1 is a block diagram of hardware 100 and operating system software 109 components of a data processing system, according to embodiments. In one embodiment, the operating system 109 manages task, process, and thread access to hardware 100 via one or more subsystems, including an exemplary processing subsystem 110 and input/output (I/O) subsystem 120. The processing subsystem 110 includes scheduler 112, as well as timer 114, power 116, and thermal 118 managers. The I/O subsystem 120 includes a scheduler 122 and a throughput manager 124. Each illustrated element of the processing subsystem 110 or I/O subsystem 120 can be a task, process, or thread executing on one or more microprocessor devices (e.g., μP(s) 102) of the hardware 100. In one embodiment the hardware 100 includes the one or more microprocessor devices, as well as memory 104, one or more sensor 105, network 106, and storage 108 devices.

In one embodiment, the processing subsystem 110 manages life cycle and scheduling for tasks, process, and threads executing on the one or more microprocessor devices 102, while the I/O subsystem 120 manages and arbitrates access to I/O devices, such as the network 106 and storage 108 devices. I/O scheduling and throughput can be controlled by an I/O scheduler 122 and throughput 124 manager using several priority based methods that can be tuned based on various priority values.

In one embodiment, the scheduler 112 of the processing subsystem 110 can assign a schedule priority to indicate the urgency or importance associated with a task, process, or thread. Embodiments described herein can manage execution at several levels of abstraction, including a task or process abstraction and a thread abstraction. Tasks and processes are similar and are used interchangeably herein. A task or process describes a unit of resource ownership including a virtual address space and one or more threads. A thread is a unit execution within a task or process, and is the smallest sequence of programmed instructions that can be managed by the scheduler 112 of the processing subsystem 110.

In one embodiment, the schedule priority is assigned to a task or thread based in a QoS classification. The specific QoS classifications can vary according to embodiments, but are generally determined based on the maximum acceptable latency for execution of a given task. Accordingly, the highest priority QoS classes (e.g., A/V rendering, user interactive) are associated with tasks that perform real-time audio or video rendering or define or manage interactive user interface elements, allowing threads associated with those tasks to be scheduled for processing ahead of other tasks. Additionally, a task with a higher priority or QoS class relative to other executing tasks may be allowed to consume a larger amount of processor resources, allowing the task to be more responsive to input relative to a task having a lower priority (e.g., background tasks) provided sufficient processor resources exist to service all high priority tasks. In one embodiment, the hardware 100 and operating system software 109 can be configured to dynamically increase or decrease the amount of available processing resources based on the thread scheduling latency experienced by threads executed by the processing subsystem 110, as further described in relation to FIG. 2.

CPU Performance Controller and Scheduler Operation

Figure 2:
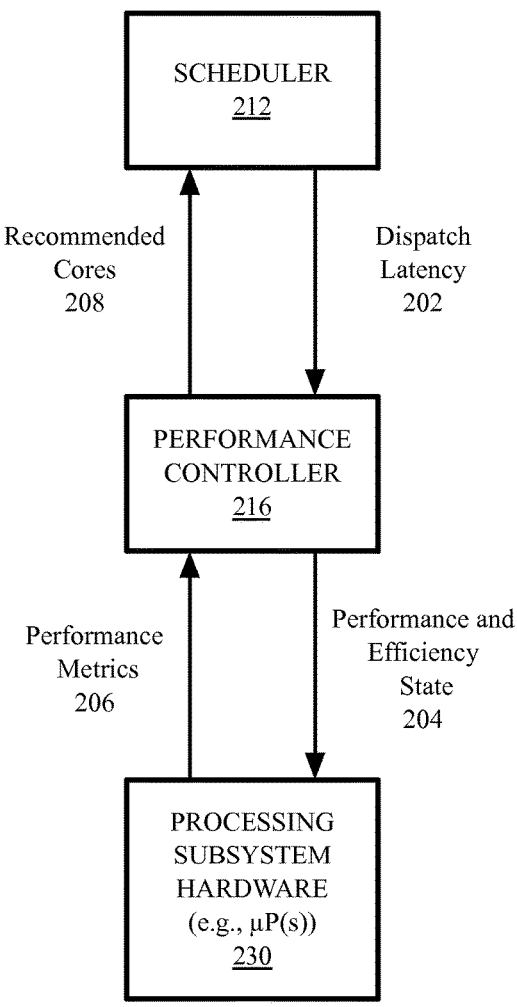
FIG. 2 is a block diagram of CPU performance controller and scheduler system, according to an embodiment.

FIG. 2 is a block diagram of a CPU performance controller and scheduler system 200, according to an embodiment. The CPU performance controller and scheduler system 200 includes a scheduler 212, a performance controller 216, and processing subsystem hardware 230. In one embodiment, the scheduler 212 is the scheduler 112 included in the software processing subsystem 110 of FIG. 1. The performance controller 216 can be or include logic within a programmable power management integrated circuit included within a dynamic voltage and frequency management system, or can include logic within an operating system power manager (e.g., power 116 manager of FIG. 1). The processing subsystem hardware 230 can include one or more microprocessor devices, which may be multi-core processor devices. In one embodiment, the processing subsystem hardware 230 includes multiple processors or processor cores that may be enabled or disabled based on performance metrics such as scheduling latency and processor utilization.

During operation, the scheduler 212 can schedule threads on the processing subsystem hardware 230 based on available processing resources. The processing subsystem hardware 230 be managed by the scheduler 212 via preemptive multitasking, in which the scheduler 212 uses some criteria to determine how long to allocate to any one thread before preempting the thread and allowing an additional thread to execute. At least one thread can be scheduled on each available core of the processing subsystem hardware 230.

In one embodiment, for each scheduled thread, the scheduler 212 can report to the performance controller 216 the dispatch latency 202 observed while attempting to schedule the thread on the processing system hardware 230. The dispatch latency 202 can be determined based on the latency observed by the scheduler 212 between receiving a thread dispatch request and dispatching the thread to the processing system hardware 230. The performance controller 216 can use the received dispatch latency 202 to set a performance and efficiency state 204 for the processing subsystem hardware 230. In one embodiment, the performance controller 216 maintains a history of the dispatch latency 202 received from the scheduler and, based on a statistical analysis of the history of the dispatch latency 202, can provide a set of recommended cores 208 to the scheduler 212 for use in thread scheduling. In one embodiment, the performance controller receives performance metrics 206 from the processing subsystem hardware 230, including processor utilization. During periods of high processor utilization, the performance controller 216 can increase the number of cores in the set of recommended cores 208, or can recommend a different set of cores, where the processor cores in the processing subsystem hardware 230 have asymmetric performance characteristics. In one embodiment, the performance metrics 206 received by the performance controller 216 can be used in conjunction with dispatch latency 202 to provide a set of recommended cores 208 to the scheduler 212.

In addition to the dispatch latency 202 received from the scheduler 212 and the performance metrics 206 received from the processing subsystem hardware 230, the performance controller 216 may consider a variety of other factors to determine the set of recommended cores 208 to provide to the scheduler, with a general goal of balancing the overall performance and energy consumption of the system. For example and in one embodiment, thermal control logic (e.g., the thermal 118 controller of FIG. 1) can request that the performance controller 216 reduce the number of cores in the set of recommended cores 208 to reduce the thermal load caused by the processing subsystem hardware 230. In one embodiment the performance controller 216 can reduce the number of cores in the set of recommended cores 208 during a low battery condition, or to otherwise maintain a lower state of energy consumption relative to standard or high-performance operation.

In one embodiment, the performance controller 216 can maintain a set of per-thread metrics in a thread state buffer provided by the scheduler 212. The per-thread metrics can include, but are not limited to instructions per cycle (IPC), memory throughput, and I/O activity. While the performance controller 216 can be configured to track the per-thread metrics for all executing threads, in one embodiment, the performance controller 216 tracks per-thread metrics only for threads considered "important," based on thread priority or QoS class. In one embodiment the performance controller 216 uses the per-thread metrics to make general or per-thread scheduling recommendations to the scheduler 212. In one embodiment the thread state buffer memory management is handled entirely by the scheduler 212, without requiring dynamic memory allocation on the part of the performance controller 216. In one embodiment, the thread state buffer is stored in shared memory that is visible and accessible to the scheduler 212 and the performance controller 216. In one embodiment, the performance controller 216 performs dynamic memory management while tracking per-thread metrics and receives a callback on thread destruction to enable the performance controller 216 to de-allocate any allocated memory for the thread.

The scheduler 212, having received a set of recommended cores 208 from the performance controller 216, may endeavor to schedule threads only on the processor cores listed in the set of recommended cores, although the fidelity of the scheduler 212 to the recommendations from the performance controller 216 can vary across embodiments. If threads are not scheduled on non-recommended cores, those cores can be allowed to enter an idle and/or low power state, which can reduce the overall energy consumption and/or heat dissipation of the processing system hardware 230. In one embodiment, processor cores that are not recommended are transitioned to a low power state once the dispatch queues associated with those cores are drained and any threads executing on the cores complete or are pre-empted. In one embodiment, processor cores that are not recommended can be transitioned into a forced idle state.

In one embodiment, external interrupts (e.g., those originating from peripheral devices) are enabled only on the processor cores in the set of recommended cores 208 and are masked for processor cores that are not recommended. Handling external interrupts only using recommended processor cores can allow the remaining cores in the system to remain in a low power state for a longer period of time, and can provide the performance controller 216 greater control over the set of processor cores that are enabled or disabled at any given time. In one embodiment, all cores maintain the ability to receive inter-processor interrupts, such that a recommended core can interrupt a non-recommended core to purposefully wake the non-recommended core from a low power state.

Figure 3:
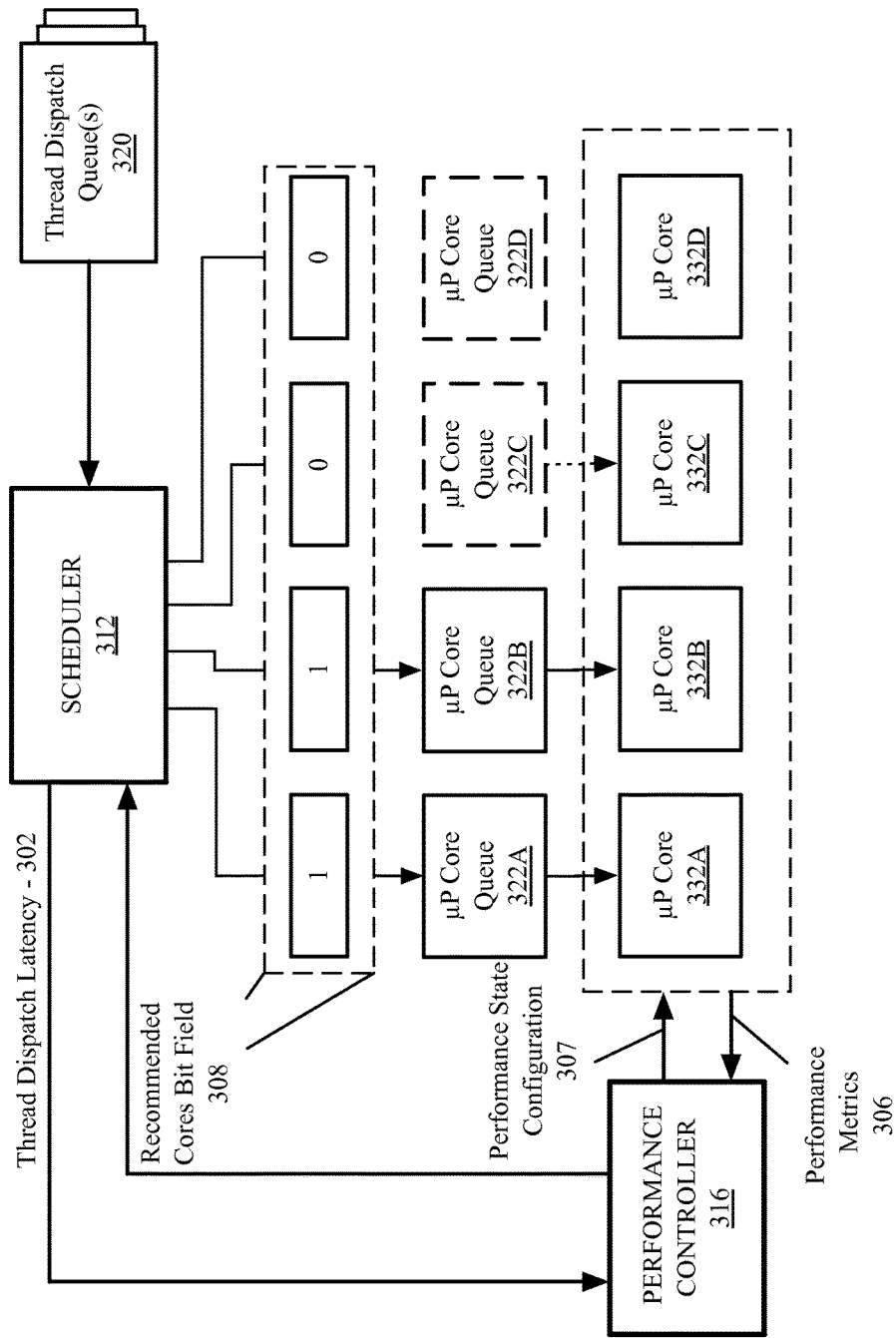
FIG. 3 is a block diagram of a system to perform processor core recommendation, according to an embodiment.

FIG. 3 is a block diagram of a processor core recommendation system 300, according to an embodiment. In one embodiment, the processor core recommendation system 300 is a closed loop information exchange system between a scheduler 312 and a performance controller 316, which can be implementations of the scheduler 212 and performance controller 216 of FIG. 2. In addition to the scheduler 312 and the performance controller 316, the system can include one or more thread dispatch queue(s) 320, a recommended cores bit field 308, a set of microprocessor core queues (e.g., μP Core Queue 322A-D), and a set of microprocessor cores (e.g., μP Core 332A-D).

In one embodiment, the scheduler 312 can receive or retrieve threads from one or more thread dispatch queue(s) 320, which include threads dispatched to perform operations for tasks or processes scheduled by higher levels of an operating system. The scheduler 312 can schedule individual threads for execution on a set of microprocessor cores 332A-D based on recommended cores bit field 308 that defines the set of recommended cores that the performance controller 316 recommends for use by the scheduler 312. In one embodiment, the recommended cores bit field 308 includes one bit for each of the microprocessor cores 332A-D and the scheduler 312 does not schedule threads on cores having unset bits. The scheduler 312 can insert threads scheduled on a processor into one of the microprocessor core queues 322A-D. In one embodiment, each microprocessor core queue 322A-D includes a processor run-queue for storing threads executing and/or ready for execution on the respective microprocessor cores 332A-D.

As illustrated in FIG. 3, microprocessor core 332A and microprocessor core 332B are indicated as recommended cores and the scheduler 312 can insert threads for execution into the microprocessor core queue 322A and microprocessor core queue 322B, which are associated with microprocessor core 332A and microprocessor core 332B respectively. As illustrated, microprocessor core queue 322C is not in the set of recommended cores based on the recommended cores bit field 308. In one embodiment, while the scheduler 312 will not schedule threads on microprocessor core 332C, any threads in the associated microprocessor core queue 322C will be allowed to continue executing until complete or pre-empted by the scheduler 312. Alternatively, when microprocessor core 332C is removed from the set of recommended cores based on the recommended cores bit field 308, all threads in microprocessor queue 322C can be pre-empted and microprocessor core 332C can be transitioned into a forced idle state. In one embodiment, the performance controller 316 can send power state configuration 307 messages to and retrieve performance metrics 306 from each of the microprocessor cores 332A-D.

The scheduler 312 can periodically send thread dispatch latency 302 data to the performance controller 316. In return the performance controller can send information including a recommended cores bit field 308 to the scheduler 312. In one embodiment, the scheduler 312 and performance controller 316 exchange information using API callbacks between the scheduler 312 and the performance controller 316. In one embodiment the scheduler 312 makes a first API call each time that the scheduler 312 is to dispatch a thread to the one or more processor cores queues 322A-D. In such embodiment, the first API call can indicate the thread dispatch latency 302 for the thread. In one embodiment, the scheduler 312 makes a second API call each time the scheduler is to pre-empt or otherwise remove a thread from one of the processor cores 332A-B. In one embodiment, during the second API call, the performance controller 316 can return the recommended cores bit field 308 to the scheduler. 312. In one embodiment, the second API call is synchronous with the scheduler taking a thread off core. In one embodiment, the second API call to return the recommended cores bit field 308 is asynchronous with the scheduler and is not constrained to the timing of the scheduler. Additional specifics of the API are illustrated in FIG. 4.

CPU Performance Controller and Scheduler API

Figure 4:
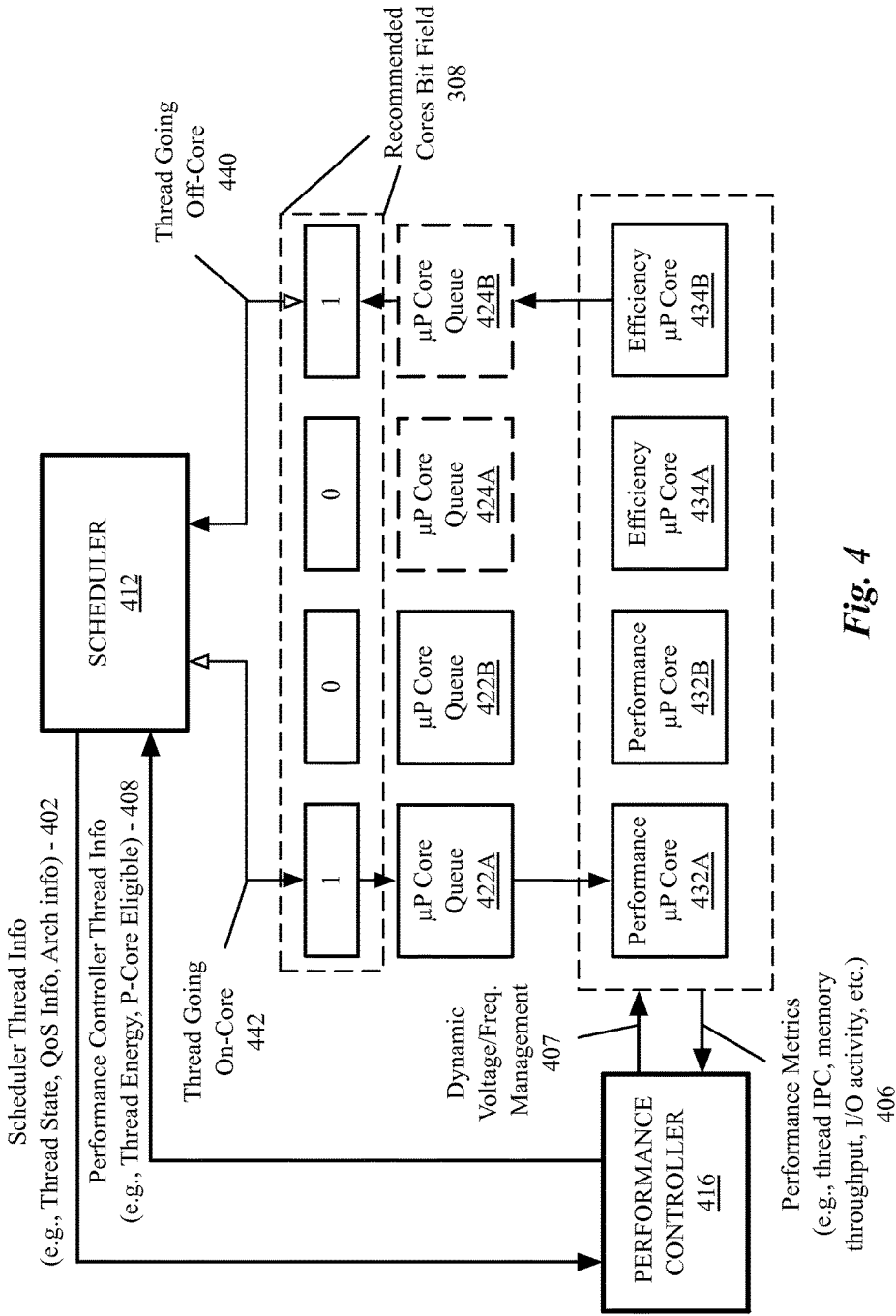
FIG. 4 is a block diagram of system to perform closed loop thread information exchange between a performance controller and scheduler, according to an embodiment.

FIG. 4 is a block diagram of closed loop thread information exchange system 400 between a performance controller and scheduler, according to an embodiment. The thread information exchange system 400 can be configured to provide support for one or more asymmetric multi-core processors having processor cores having differing performance characteristics. In one embodiment, an asymmetric processor can include one or more performance microprocessor cores (e.g., Performance μP Core 432A-B) that operate in concert with one or more efficiency microprocessor cores (e.g., Efficiency μP Core 434A-B). The degree to which the efficiency and performance characteristics of the cores differ can vary across embodiments, as can the underlying details regarding the nature of the differing characteristics. For example and in one embodiment, the difference in performance and efficiency between the cores is based on a differing operational clock frequency, where the performance microprocessor cores 432A-B are clocked at a higher frequency and operate at a higher voltage than the efficiency microprocessor cores 434A-B.

In one embodiment, the specific operational performance and efficiency characteristics of the processor cores can be adjusted based on dynamic voltage and frequency management 407 settings provided by the performance controller 416. In return, the performance controller 416 can receive or retrieve performance metrics 406 that enable the performance controller to compute metrics for executing threads. Performance metrics computed by the performance controller can include but are not limited to overall and/or per-thread instructions per cycle, memory throughput, and I/O activity. In one embodiment, this information can be transmitted to the scheduler 412 as performance controller thread information 408 including an estimate of energy consumed by a processor core while executing a thread and whether a specific thread is eligible to be scheduled on one of the performance microprocessor cores 432A-B. In return, the performance controller 416 can receive scheduler thread information 402 from the scheduler.

In one embodiment the scheduler thread information includes a thread state buffer, thread priority data including QoS information for the thread, and architectural information for the thread. The architectural information can include hints to the scheduler information such as whether the instructions for the thread are 32-bit or 64-bit. In one embodiment, the architectural information additionally includes whether the thread includes instructions that make use of a specific architectural feature that is not present or in all processor cores, or unsupported by specific processor cores.

In one embodiment, the thread information exchange system 400 includes an API to enable communication between logic within an exemplary scheduler 412 and performance controller 416. The API can include callbacks to the performance controller 416 from the scheduler 412 that are called when the scheduler is placing a thread on a processor core (e.g., thread going on-core 442). The scheduler 412 can call the thread going on-core 442 API callback contemporaneously with placing a thread on a processor core for execution. In one embedment, the thread going-on core 442 call is made when the scheduler 412 places a thread into one of the microprocessor core queues 422A-B, 424A-B, which in one embodiment are processor run queues storing executing threads and/or threads that are ready for execution on the performance microprocessor core 432A-B or the efficiency microprocessor core 434A-B.

In one embodiment, code illustrating exemplary headers for the respective API calls is shown in Table 1 and Table 2 below.

TABLE 1

Exemplary Parameters for Thread Going On-Core API Call

```
struct going_on_core {
    perfcontrol_state_t  *state;              //Thread State Buffer
    uint32_t             qos_class;           //QoS Class of Thread
    uint64_t             qos_param1;          //First QoS Parameter
    uint64_t             qos_param2;          //Second QoS Parameter
    uint32_t             scheduling_latency_usec; //Latency in microseconds
    uint32_t             is_32_bit: 1;        //Arch Info
};
```

Table 1 shows exemplary parameters for a thread going on-core 442 API call, according to an embodiment. In one embodiment the exemplary parameters of the thread going-on core 442 API call can be used to transmit scheduler thread information 402 from the scheduler to the performance controller. The parameters can include a pointer to a performance control thread state buffer that contains identifying information for the thread and can store thread specific performance metrics, as well as a QoS class and a first and second QoS parameter that can specify additional QoS details for the thread, such as QoS parameters for use when calling kernel power management routines. The parameters can additionally include a scheduling latency, which in one embodiment is reported in microseconds. In one embodiment the parameters include architectural information, such as whether the thread is a 32-bit thread or, alternatively, whether the thread is not a 64-bit thread.

TABLE 2

Exemplary Parameters for Thread Going Off-Core API Call

```
struct going_off_core {
    uint32_t  recommended_cores;      // Bit i set => core i recommended
    uint32_t  energy_estimate_nj;     // In nanojoules.
    uint32_t  is_p_core_eligible : 1; // OK for performance core
};
```

Table 2 shows exemplary parameters for a thread going off-core 440 API call, according to an embodiment. In one embodiment, the exemplary parameters of the thread going off-core 440 API call can be used to transmit performance controller thread information 408 to the scheduler 412. In one embodiment, the performance controller can also provide per-thread performance metrics to the scheduler using the performance control state buffer provided to the performance controller during the thread going on-core 442 API call.

In one embodiment, the scheduler 412 can perform a thread going off-core 440 API call during a context switch to a thread that is ready to execute. The thread going off-core 440 API call can have exemplary parameters including a bit field specifying the set of recommended cores (e.g., recommended cores bit field 308 of FIG. 3), as well as information specific to the thread going off the core, including an estimate of energy usage caused by the thread during the last execution period and a hint to the scheduler 412 as to whether the thread is eligible for future scheduling on one of the performance microprocessor cores 432A-B. The set of recommended cores provided to the scheduler 412 may not directly correlate with set of currently active processors, as recommended cores may transition to an idle or low power state if a core is not associated with any ready or executing threads. Additionally, the set of recommended cores may be transmitted via any of several API calls and is not specifically limited to the thread going-off core API call. In one embodiment, a separate API call is available to communicate the set of recommended processor cores.

Whether a thread is eligible for execution on a performance microprocessor core 432A-B can be determined based on a variety of factors. In one embodiment, performance controller logic 416 analyzes the performance metrics 406 received while executing a thread to balance execution speed and execution efficiency across the system. Based on factors such as the relative importance of a thread (e.g., based on QoS class), the degree to which the thread consumes system resources (e.g., memory and/or I/O throughput), and/or the execution efficiency of the thread (e.g., thread IPC), the performance controller can make a recommendation as to whether a thread should be executed or continue to be executed on a performance microprocessor core 432A-B or whether the thread should be executed on one of the efficiency microprocessor cores 434A-B.

In one embodiment, the indication that a thread is performance core eligible is a hint to the scheduler 412, which may be conditionally executed based on several factors including the degree of contention for an active performance microprocessor core (e.g., microprocessor core 432A). In one embodiment, the performance controller 416 synchronizes performance core eligibility recommendations with the recommended cores bit field 308, such that when a thread is hinted as performance core eligible, at least one performance microprocessor core is recommended. For example and in one embodiment, at least one performance microprocessor core (e.g., performance microprocessor core 432A) is recommended if any one thread is hinted as performance core eligible in the performance controller thread information 408 provided to the scheduler 412. In one embodiment, the performance controller continuously reevaluates performance core eligibility even when no performance cores are recommended. In such embodiment, a number of threads may be known to the scheduler as being performance core-eligible as soon as the performance controller recommends the use of performance cores. In one embodiment, at least one efficiency microprocessor core (e.g., efficiency microprocessor core 434B) can be recommended while threads are ready for execution.

In one embodiment, the performance controller synchronizes the set of recommended cores with architectural information provided by the scheduler 412. For example, the architectural information can indicate whether the thread includes instructions that make use of a specific architectural feature that is not present or in all processor cores, that is unsupported by specific processor cores, or is known to execute faster or more efficiently on specific processor cores. In such embodiment, the performance controller can include within the set of recommended processor cores at least one processor core having support for the architectural features specified for the thread.

In various embodiments, a performance controller as described herein (e.g., any of performance controllers 216, 316, 416) can determine the number and/or specific cores to recommend based on a computed "control effort." In one embodiment the computed control effort can be applied to one or more control mapping tables to determine the number of cores to recommend. In embodiments featuring asymmetric cores, the specific types of cores to recommend can be determined at least in part based on the control effort, as well as other overall and/or per-thread performance metrics described herein (e.g., performance metrics 406).

Recommending Processor Cores Based on Control Effort Determination.

Figure 5A:
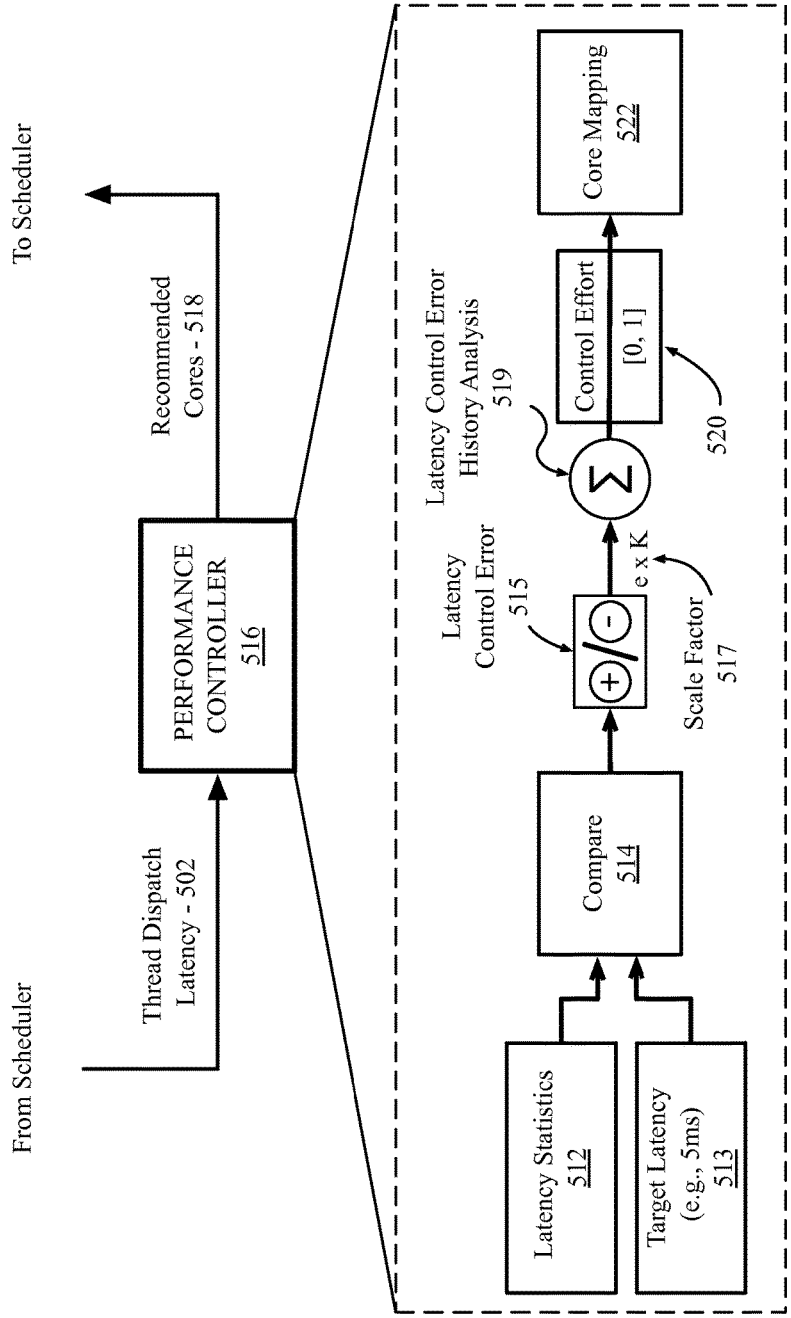
FIGS. 5A-C are block diagrams various forms of control effort determination by a performance controller, according to embodiments.
Figure 5B:
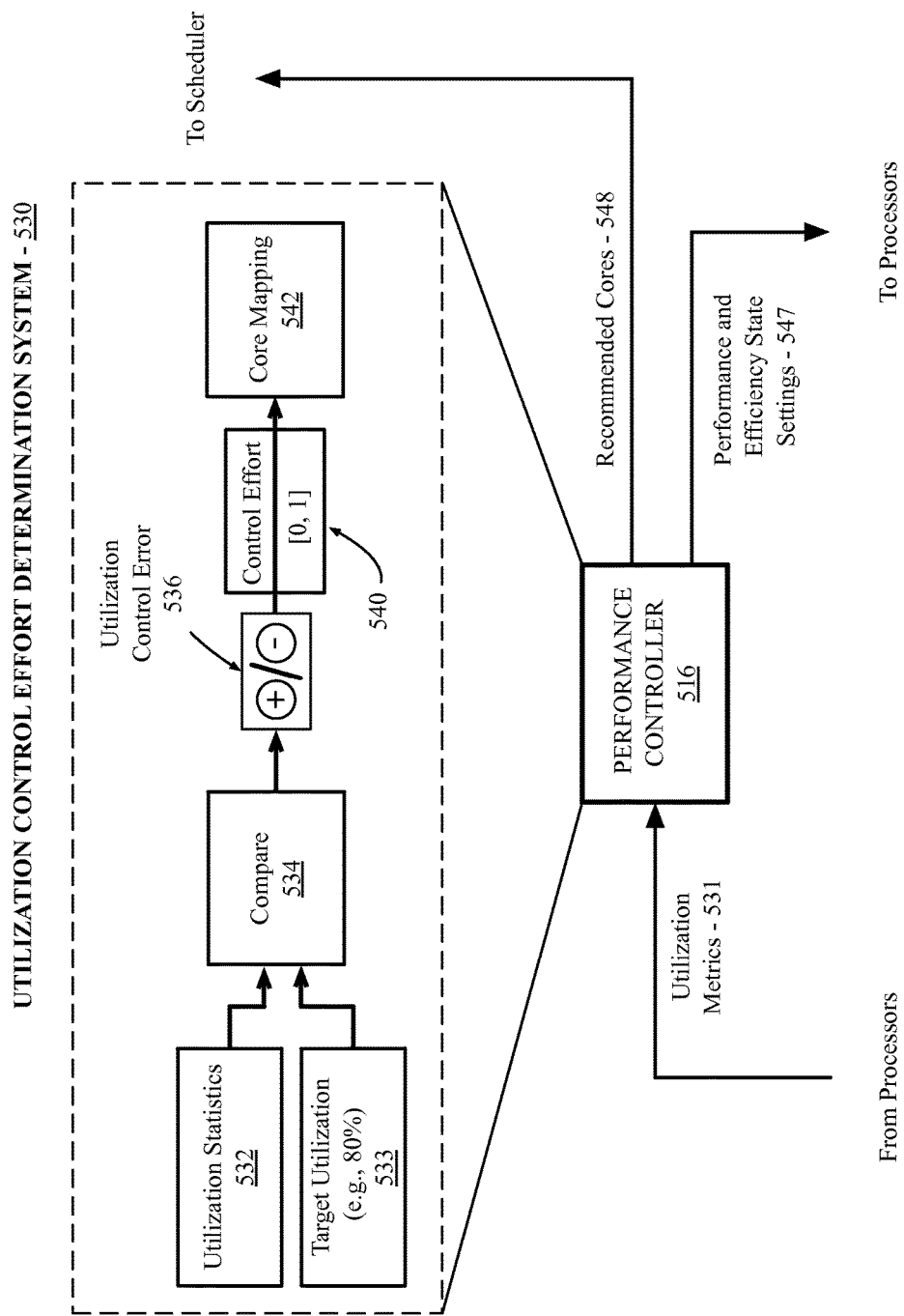
Figure 5C:
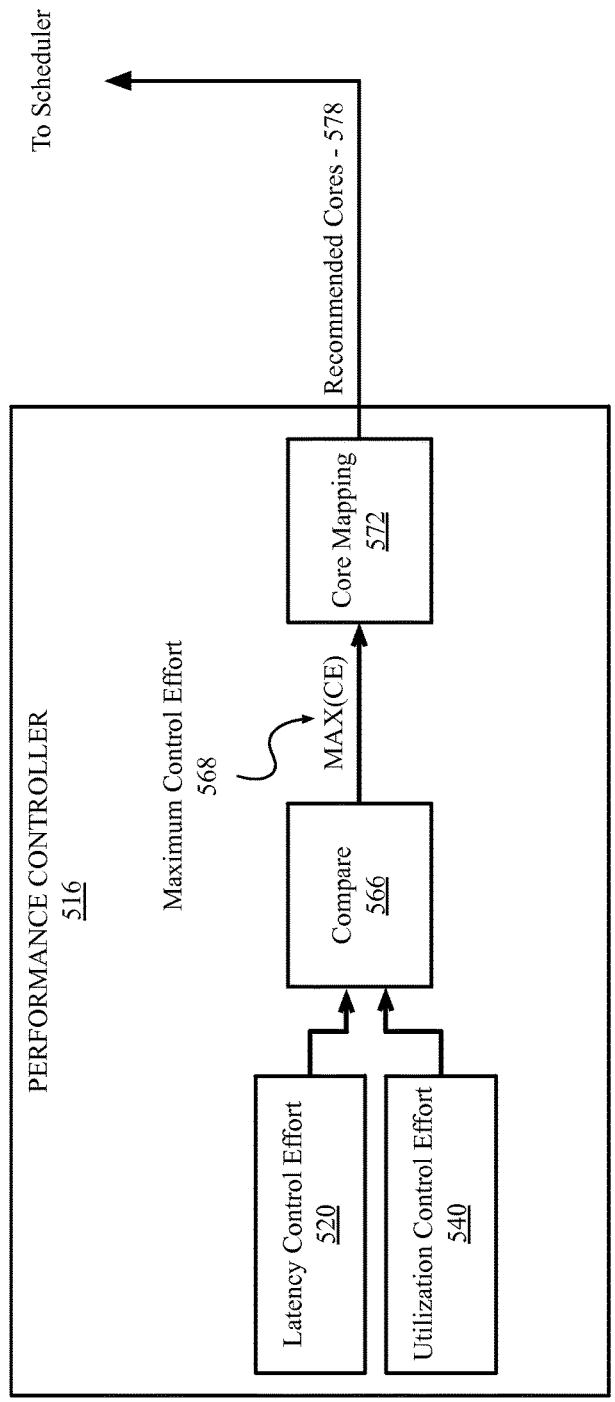

FIGS. 5A-C are block diagrams of systems used by a performance controller 516 to perform various forms of control effort determination, according to embodiments. FIG. 5A is a block diagram of latency control effort determination system 500 in which the performance controller 516 uses thread dispatch latency 502 from a scheduler to derive a set of recommended cores 518. FIG. 5B is a block diagram of a utilization control effort determination system 530 in which the performance controller 516 uses utilization metrics 531 received from processing subsystem hardware to derive a set of recommended cores 548. FIG. 5C is a block diagram of a combined control effort processor core recommendation system 560 in which the performance controller 516 uses a latency control effort 520 and a utilization control effort 540 to derive a set of recommended cores 578.

FIG. 5A shows an embodiment in which a latency control effort determination system 500 determines a set of recommended cores 518 based on thread dispatch latency 502. The performance controller 516 can receive the thread dispatch latency 502 and derive a set of latency statistics 512. The latency statistics 512 can include a statistical mean, median, mode, distribution, range, maximum, etc. of a set of one or more instances of thread dispatch latency 502 received by the performance controller 516 over a period. The specific length of the period and the specific statistical metric can vary across embodiments based on hardware or software configuration and/or expected use case. The latency statistics 512 can be compared with target latency 513. Exemplary target latency 513 is 5 milliseconds, although the target latency 513 can vary across embodiments and in one embodiment can be dynamically determined. Compare 514 logic within or associated with the performance controller 516 can be used to determine a latency control error 515 based on a comparison of the latency statistics 512 and the target latency 513. The latency control error 515 can be expressed as a positive or negative value based on whether one or more aspects of the latency statistics 512 are above or below the target latency 513. In one embodiment a scale factor 517 can be applied to the computed latency control error 515.

Logic within or associated with the performance controller 516 can then perform a latency control error history analysis 519 to compute a control effort 520. In one embodiment the control effort 520 is clamped and/or scaled to a number within the unit interval [0, 1], although other control effort representations can also be used. The control effort 520 can be applied to a core mapping 522 to determine the number of cores to recommend for the set of recommended cores 518. The granularity of core mapping 522 to control effort 520 can be determined at least in part based on the number of processor cores available in the system. An exemplary mapping between control effort and recommended cores is shown in Table 3.

TABLE 3

Exemplary Core Mapping for Recommended Cores

| Control Effort | Cores |
|---|---|
| 0->0.25 | 0 |
| 0.26->0.5 | 0 + 1 |
| 0.51->0.75 | 0 + 1 + 2 |
| 0.76->1 | 0 + 1 + 2 + 3 |

Table 3 shows an exemplary core mapping 522 between a computed control effort and a set of recommended cores. The system in which the exemplary core mapping of Table 3 includes four processor cores which have a processor core designation of 0, 1, 2, and 3 respectively. In one embodiment, as shown in Table 3, the core mapping is an equal distribution across the types of cores available, where a greater number of cores are recommended in linear relation with the control effort. However, a weighted mapping of cores may also be used, for example, in an asymmetric multicore environment.

As shown in Table 3, the core mapping can also be used to at least in part determine the specific cores to recommend, where core 0 is always recommended and cores 1, 2, and 3 can be recommended with increasingly higher control efforts. Alternatively, an embodiment may use the core mapping 522 to determine a count of processor cores in the set of recommended cores 518 and determine the specific processor cores, or specific type of processor cores to recommend based on other factors or metrics. For example, in an asymmetric processing system the performance controller 516 can recommend relatively efficient processor cores based on the number of cores determined by the core mapping 522, and add or substitute a relatively higher performance core in limited circumstances, such as when the performance controller 516 determines that at least one thread is performance core eligible. Additionally, the specific recommended cores or specific type of processor cores can be recommended based on architectural details indicated for the thread, such as whether the thread includes 64-bit or 32-bit instructions.

FIG. 5B shows a block diagram of a utilization control effort determination system 530 in which the performance controller 516 uses processor utilization metrics 531 received from processing subsystem hardware to derive a set of recommended cores 548. The utilization control effort determination system can be used, in various embodiments, as a substitute for or in addition to the latency control effort determination system 500 shown in FIG. 5A. In one embodiment, utilization statistics 532 are derived from utilization metrics 531 retrieved by the performance controller 516. The utilization statistics 532 and a target utilization 533 are input to compare 534 logic to determine a utilization control error 536. The utilization control error 536 can be used to compute a control effort 540, which can be applied to a core mapping 542 to determine a set of recommended cores 548. In one embodiment, the details with respect to the manner in which the control effort 540 and core mapping 542 are used to determine the set of recommended cores 548 are similar to those discussed with respect to the latency control effort determination system 500 as in FIG. 5A.

While an exemplary utilization target of 80 percent is shown, target utilization 533 can vary across embodiments and configurations of the various embodiments. In one embodiment the utilization statistics 532 and target utilization 533 can be single thread utilization or an aggregate utilization based on total cores or total active cores. In one embodiment, a more detailed utilization metric is determined based on additional factors including but not limited to processor run queue depth, thread scheduling latency, I/O activity, and/or memory throughput. In one embodiment an analysis the history of the utilization control error 536 is performed in a similar manner as the latency control error history analysis 519 shown in FIG. 5A.

In one embodiment, based on the set of recommended cores 548 and one or more utilization metrics, the performance controller 516 also transmits performance and efficiency state settings 547 to the processors. The performance and efficiency state settings 547 can include dynamic voltage and frequency management settings to enable or disable processor cores or to scale voltage and frequency of one or more processor cores. The performance and efficiency state settings 547 can also include changing the interrupt mask applied to one or more interrupt controllers to disable external interrupts to processor cores not in the set of recommended cores 548 and/or enable external interrupts to processor cores in the set of recommended cores 548, as described in further detail with respect to FIG. 2 above and FIG. 7 below.

FIG. 5C shows a block diagram of a combined control effort processor core recommendation system 560 in which the performance controller 516 uses a latency control effort 520 and a utilization control effort 540 to derive a set of recommended cores 578. In one embodiment, the a combined control effort processor core recommendation system 560 enables the performance controller 516 to use a combination of latency control effort 520 and utilization control effort 540. Compare 566 logic within or associated with the performance controller can compare the control efforts 520, 540. In one embodiment, a maximum control effort 568 is determined, which is the maximum of the latency control effort 520 and the utilization control effort 540. The maximum control effort 568 can be applied to a core mapping 572, which can be similar to, or different from control mapping 522 of FIG. 5A, control mapping 542 of FIG. 5B, or the control mapping shown in Table 3.

While a maximum control effort 568 is shown, other comparisons can be used in various embodiments and/or configurations of the various embodiments. In one embodiment, a minimum of the latency control effort 520 and the utilization control effort 540 is used. In one embodiment a weighted combination is used. Various mathematical relationships can be used based on the intended contribution of the respective control efforts.

Scheduler and Performance Controller Communication API Logic

Figure 6A:
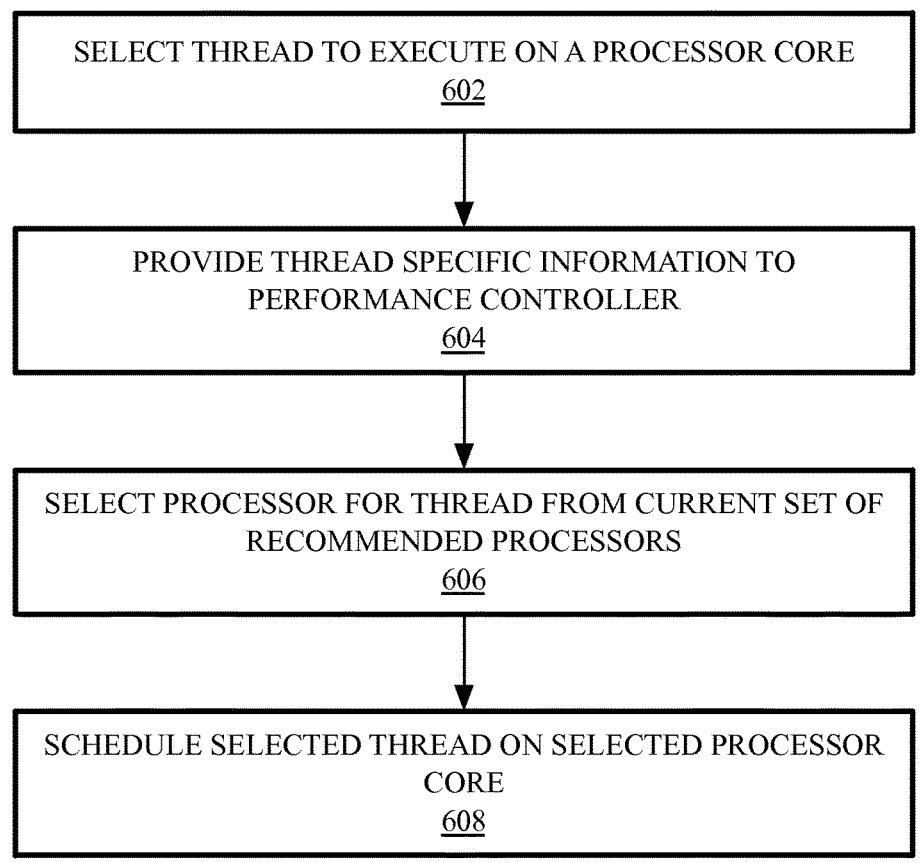
FIGS. 6A-B are a flow diagrams of scheduler logic, according to an embodiment.
Figure 6B:
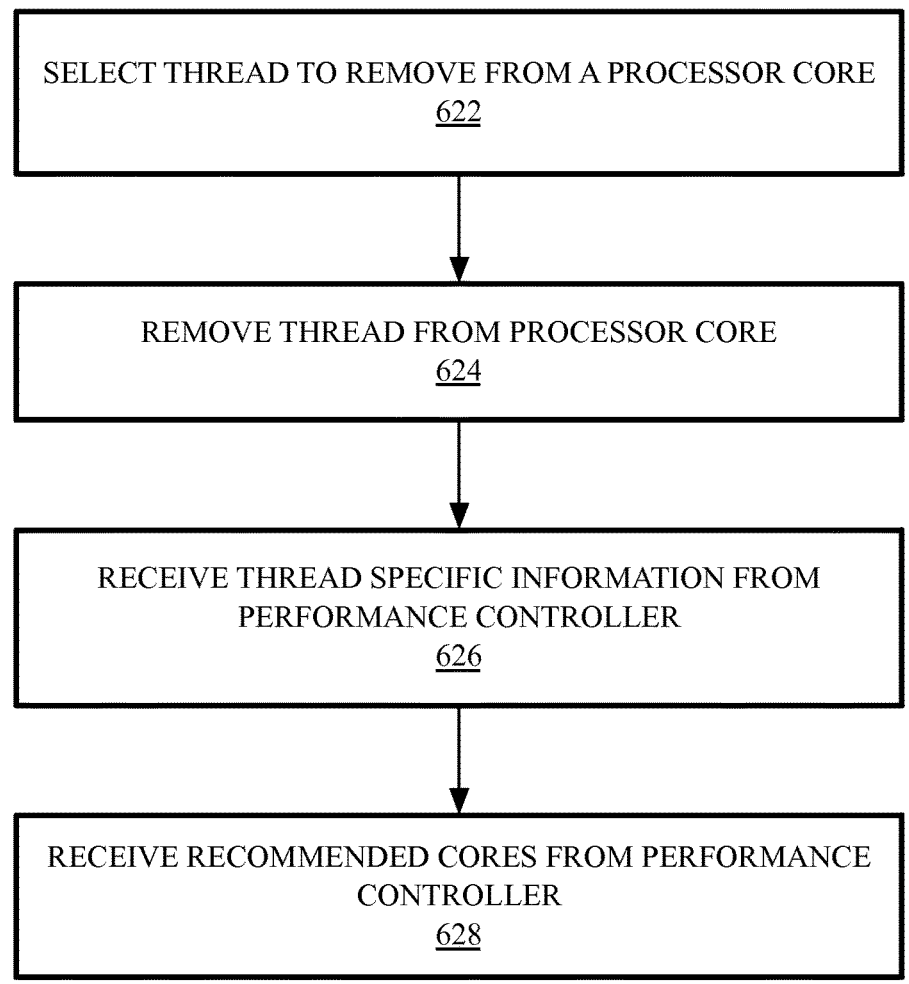

FIGS. 6A-B are a flow diagrams of scheduler logic associated with on-core and off-core API callbacks, according to an embodiment. FIG. 6A is a flow diagram of going on-core scheduler logic 600. FIG. 6B is a flow diagram of going off-core scheduler logic 620. In various embodiments, the going on-core scheduler logic 600 and the going off-core scheduler logic 620 can be performed by any scheduler described herein (e.g., scheduler 112, scheduler 212, scheduler 312, and/or scheduler 412 as in FIGS. 1-4).

FIG. 6A shows going on-core scheduler logic 600 that can be performed by a thread scheduler during a context switch event. In one embodiment, the scheduler is configured to select a thread to execute on the processor core, as shown at block 602. The thread selection algorithm utilized by the scheduler logic 600 to select the thread to execute on the processor core can be derived from one or more scheduling algorithms known in the art, including priority based scheduling, round robin scheduling, and/or deadline scheduling. In one embodiment the scheduler logic 600 uses a multi-level feedback queue algorithm for scheduling.

In one embodiment, prior to transitioning the selected thread to a running state on a processor core, the scheduler logic 600 can provide thread specific information to a CPU performance controller in the system, as shown at block 604. In one embodiment the thread specific information is provided at block 604 via a thread going on-core API callback to the performance controller from the scheduler. The thread specific information can include, but is not limited to a thread QoS classification, one or more QoS parameters for the thread, scheduling or dispatch latency for the thread, and/or architecture information for the thread. In one embodiment, the architecture information includes whether instructions for the thread are 32-bit instructions.

As shown at block 606, the scheduler logic 600 can select a processor for the thread from a current set of recommended cores. In one embodiment the set of recommended cores is provided to the scheduler as a bit field, where each active bit in the bit field corresponds to a recommended core. In such embodiment, the scheduler logic 600 may select any processor core in the set of recommended processor cores. In an alternate embodiment the scheduler logic 600 can schedule the selected thread on any one of a recommended type of processor core. In one embodiment, a specific processor core may be recommended for a specific thread, for example, if the selected thread is eligible to be scheduled on a microprocessor having relatively higher performance characteristics than other processor cores.

In one embodiment, prior to receiving an initial set of recommended processor cores, the set of recommended processor cores can be configured to a default state. For example, during system initial boot, all processor cores may be recommended. In one embodiment, a specific subset of all available processor cores is recommended by default. In various embodiments, the default set of recommended processor cores is be subsequently replaced by an updated set of recommended cores, for example, during a subsequent context switch event.

At block 608, the scheduler logic schedules the selected thread on the selected processor core. In one embodiment, the scheduler logic 600 strictly adheres to the set of recommended processor cores when scheduling the selected thread. However, the level of fidelity to the set of recommended processor cores can vary according to embodiments or configuration details of the various embodiments.

FIG. 6B shows going off-core scheduler logic 620 that can be performed by a thread scheduler during a context switch event. In one embodiment, for example when an executing thread is terminated or pre-empted, the going off-core scheduler logic 620 can be performed during a context switch event before the going on-core scheduler logic 600 of FIG. 6A schedules a new thread for execution. The scheduler logic 620 is configured to perform operations including selecting a thread to remove from a processor core, as shown at block 622. The selected thread can be removed from the processor core, as shown at block 624.

In one embodiment, as shown at block 626, the scheduler logic 620 can receive thread specific information from the performance controller. In one embodiment, thread specific information can be received from the performance controller during a going off-core API callback by the scheduler. In one embodiment, additional thread specific information can be provided to the scheduler using mechanisms such as a thread specific performance state control buffer passed to the performance controller during a thread going on-core API callback, where the performance state control buffer is stored in memory that is commonly accessible to the scheduler and the performance controller.

In one embodiment, as shown at block 628, the scheduler logic 620 can receive a set of recommended processor cores from the performance controller. The set of recommended processor cores can be determined based on the control effort determinations illustrated in FIG. 5A-C. In one embodiment, the set of recommended processor cores can be provided to the scheduler as a parameter to a processor going off-core API callback by the scheduler to the performance controller.

Figure 7:
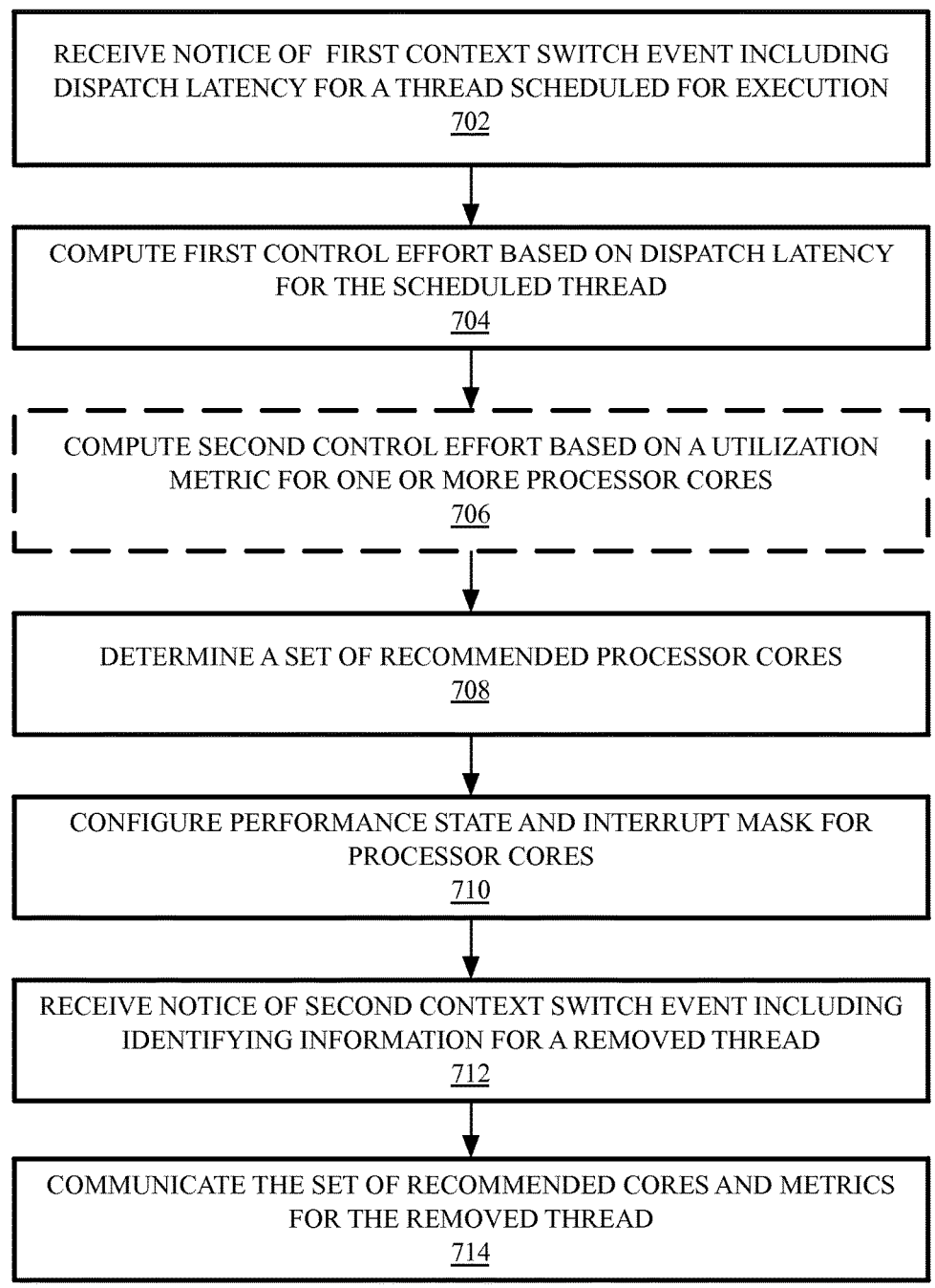
FIG. 7 is a flow diagram of performance control logic, according to an embodiment.

FIG. 7 is a flow diagram of performance control logic 700, according to an embodiment. In various embodiments, the performance control logic 700 can be performed by any power manager or controller described herein (e.g., power 116 manager, performance controller 216, performance controller 316, and/or performance controller 412 as in FIGS. 1-4). In one embodiment the performance control logic 700 is configured to perform operations including receiving a notice of a first context switch event, as shown at block 702. The notice of the first context switch event can be an API callback from the scheduler (e.g., going on-core) and can include identifying information for a thread scheduled for execution and/or dispatch latency for the thread. In one embodiment, the notice additionally includes a thread state buffer in which the performance control logic 700 can store performance and efficiency metrics for the thread. As shown at block 704, the performance control logic 700 can compute a first control effort based on the dispatch latency for the scheduled thread.

In one embodiment, as shown at block 706, the performance control logic 700 can compute a second control effort based on a utilization metric for one or more of the processor cores in the system. The second control effort can be combined with the first control effort to compute a determined set of recommended processor cores, as shown at block 708. In one embodiment, a maximum value of the first and second control effort is used to determine the set of recommended processor cores, although other mathematical relationships such as a minimum control effort or an average control effort can be used in various embodiments. In one embodiment, the performance control logic 700 can compute the first control effort for each thread and optionally compute the second control effort for selected threads. In such embodiment, the first performance control logic 700 determines the set of recommended processor cores at block 708 using the first control effort.

In one embodiment, after determining a set of recommended processor cores at block 708, the performance control logic 700 can configure or re-configure the power state and/or interrupt mask for the processor cores within the system. In one embodiment, processor cores not in the set of recommended processor cores can be transitioned to a low power state. The transition to the low power state can be performed once the non-recommended core is idle, or the non-recommended processor core can be transitioned into a forced-idle state. Additionally, interrupt masks can be set for the processor cores to disable interrupts from external devices for non-recommended processor cores. In one embodiment, when external device interrupts are disabled for a non-recommended processor core, inter-processor interrupts remain enabled.

In one embodiment, the performance control logic 700 can receive notice of a second context switch event, as shown at block 712. The notice of the second context switch event can be an API callback from the scheduler (e.g., going off-core) and can include identifying information for a thread that has been removed or is pending removal from a processor core. In response to the notice received at block 712, the performance control logic 700 can communicate (e.g., at block 714) the set of recommended cores determined at block 708. In one embodiment, the set of recommended cores may be communicated synchronously with a context switch event. In one embodiment, the set of recommended cores can be communicated asynchronously with a context switch event.

In one embodiment, the performance control logic 700 can additionally communicate metrics for the removed thread at block 714. The metrics can include an estimate of energy consumption by a processor core that is caused by the thread while the thread was executing on the processor core. The metrics can additionally include whether the thread is eligible to be scheduled on one of the relatively higher performance processor cores within the system. In one embodiment, additional metrics for the thread can be communicated at block 714, including instructions executed per cycle, memory throughput, and I/O activity. In such embodiment, the additional metrics can be communicated via a thread state buffer, a pointer to which can be communicated to the performance control logic 700 by the scheduler during the first context switch event shown at block 702.

Exemplary Data Processing System Software and Hardware

The figures below illustrate software and hardware for use in a data processing system that includes embodiments described herein. The figures and accompanying description are exemplary and other software and hardware architectures may be used without departing from the broader spirit and scope of the invention.

Figure 8:
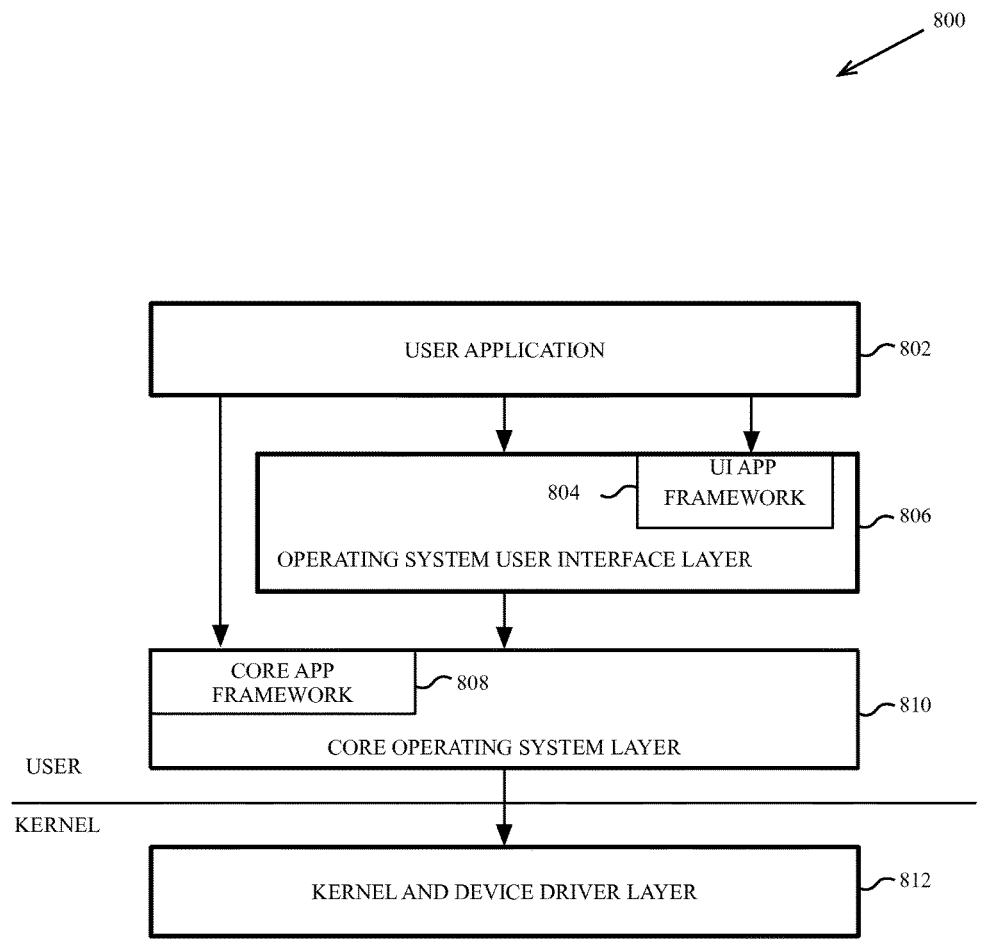
FIG. 8 is a block diagram of a multi-layer software architecture used by a data processing system, according to an embodiment.

FIG. 8 is a block diagram of a multi-layer software architecture 800 used by a data processing system, according to an embodiment. The software components are illustrated with a division between user space and a kernel space. Although other arrangements are possible, user applications (e.g., user application 802), and some operating system components (e.g., operating system user interface layer 806, and the core operating system layer 810) execute in user space. In kernel space, the operating system kernel and a set of device drivers operate in the kernel and device driver layer 812. The kernel and device driver layer 812 manage the underlying functionality of the overall operating system and provide a formalized and secure mechanism for user space software to access data processing system hardware.

A user interface (UI) application framework 804 provides a mechanism for the user application 802 to access UI services provided by the operating system (OS) UI layer 806. Underlying operating system functions that are not related to the user interface can be performed in the core operating system layer 810. One or more data management frameworks, such as a core app framework 808 can be made available to a user application to facilitate access to operating system functions.

The exemplary user application 802 may be any one of a plurality of user applications. Each user application 802 can include one or more processes or tasks, which may spawn multiple threads. The user application 802 can access instructions in an exemplary UI app framework 804 for creating and drawing graphical user interface objects such as icons, buttons, windows, dialogs, controls, menus, and other user interface elements. The UI application framework 804 also provides additional functionality including menu management, window management, and document management, as well as file open and save dialogs, drag-and-drop, and copy-and-paste handling.

The core operating system layer 810 contains operating system components that implement features including and related to application security, system configuration, graphics and media hardware acceleration, and directory services. Multiple application frameworks, including the core app framework 808, provide a set of APIs to enable a user application 802 to access core services that are essential to the application, but are not directly related to the user interface of the application. The core app framework 808 can facilitate an application's access to database services, credential and security services, backup services, data synchronization services, and other underlying functionality that may be useful to an application.

The core app framework 808, or equivalent application frameworks, can provide access to remote server based storage for functionality including synchronized document storage, key-value storage, and database services. Key-value storage allows a user application 802 to share small amounts of data such as user preferences or bookmarks among multiple instances of the user application 802 across multiple client devices. The user application 802 can also access server-based, multi-device database solutions via the core app framework 808.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

Figure 9:
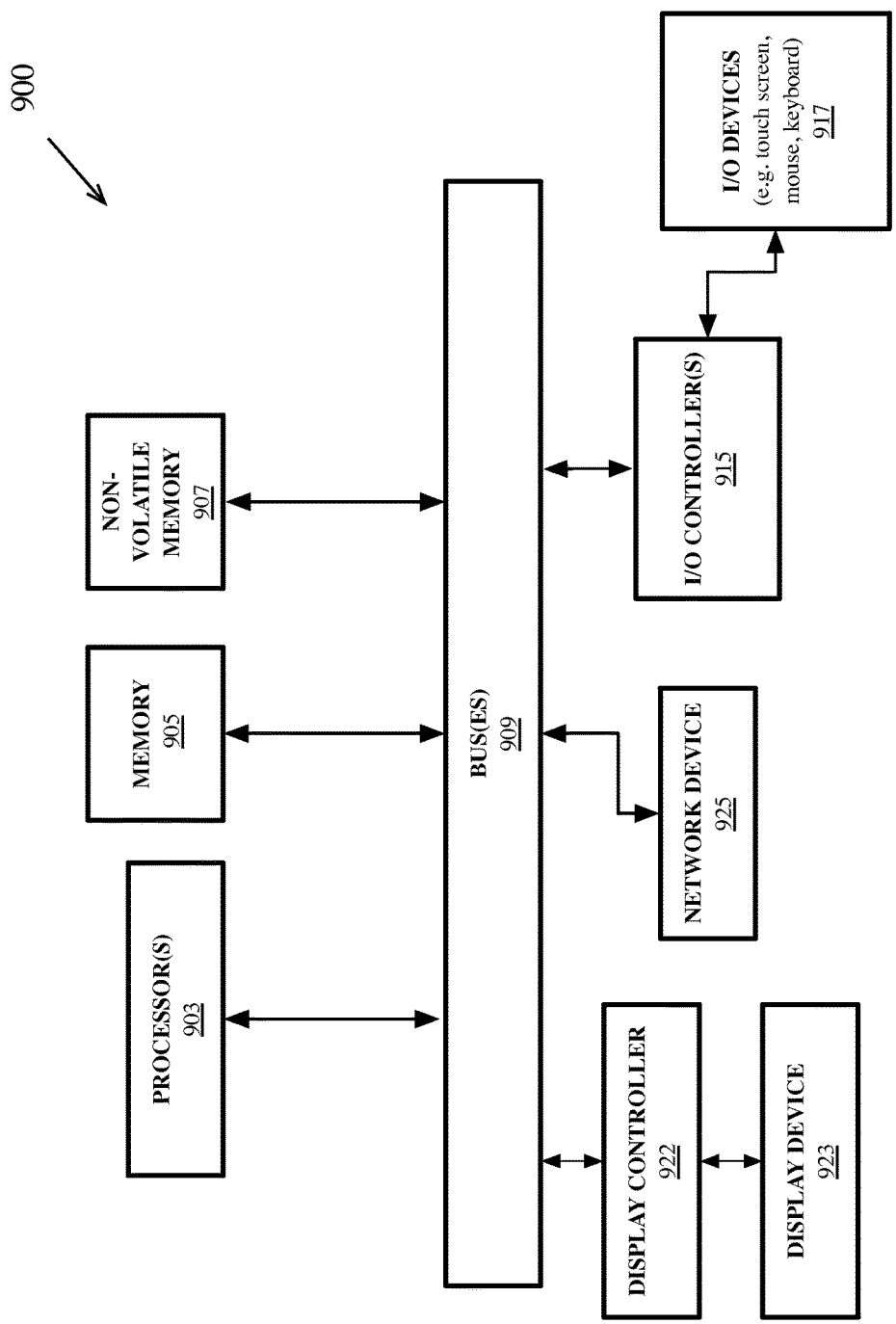
FIG. 9 is a block diagram of data processing system hardware according to an embodiment.

FIG. 9 is a block diagram of data processing system hardware 900 according to an embodiment. Note that while FIG. 9 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processors 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system 900 can also include explicitly non-volatile memory 907, such as data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system 900 can also include one or more input/output (I/O) controllers 915 which provide interfaces for one or more I/O devices, such as one or more mice, touch screens, touch pads, joysticks, and other input devices including those known in the art and output devices (e.g. speakers). The input/output devices 917 are coupled through one or more I/O controllers 915 as is known in the art.

While the system 900 illustrates the memory 905 and non-volatile memory 907 as coupled to the one or more buses directly, in one embodiment the non-volatile memory 907 can be remote from the system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

Figure 10:
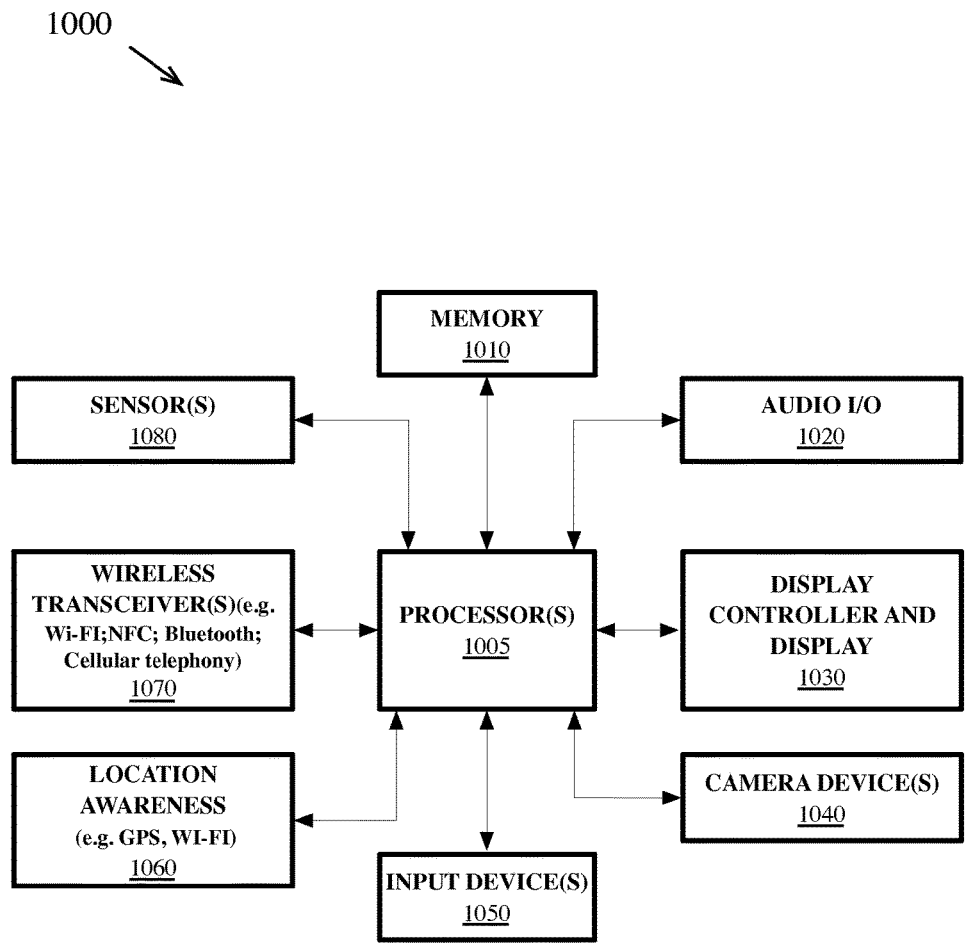
FIG. 10 is a block diagram of an additional data processing system, according to an embodiment.

FIG. 10 is a block diagram of an additional data processing system, according to an embodiment. The data processing system 1000 illustrated can include hardware components that are optimized for use in mobile or handheld devices, and may be included within a system on a chip integrated circuit. One or more buses or interfaces that are not shown can be used to interconnect the various components, as known in the art. An electronic device constructed using the illustrated data processing system may include additional or fewer components than shown.

The data processing system 1000 can include a processing system having one or more processor(s) 1005, as well as memory 1010 for storing data and programs for execution. An audio I/O subsystem 1020 is included, which may include a microphone and a speaker for telephone or video conferencing or for the recording and playback of music. In one embodiment, one or more sensor(s) 1080 are included, such as thermal sensors, motion sensors, and/or touch sensors.

A display controller and display device 1030 can be included to provide a graphical user interface for the user, and a wireless transceiver 1070 may be available to transmit and receive data via one or more wireless technologies, such as Wi-Fi, infrared, Bluetooth, or one or more variants of wireless radio technology. The system can contain one or more camera devices 1040 in both a front and rear facing configuration, though similarly configured systems each with only a front facing camera or rear facing camera can be one of many optimal configurations. The data processing system also includes one or more input devices 1050 to enable a user to provide input to the system. Input devices may include a keypad or keyboard, alone or in conjunction with a touch or multi touch panel that is overlaid on the display device 1030. The display device and touch panel can be adjusted in real time using factory-generated calibration data. The data processing system 1000 can also include a device for providing location awareness services 1060 via a Global Positioning System (GPS) device, WI-FI location awareness, or an equivalent service.

It will be apparent from this description that aspects of the present invention may be embodied, at least in part, in software. That is, the techniques may be carried out in a data processing system in response to its processor executing a sequence of instructions contained in a storage medium, such as embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for scheduler and CPU performance controller cooperation according to embodiments and examples described herein. Additionally various components described herein can be a means for performing the operations or functions described in accordance with an embodiment.

One embodiment provides for a method comprising receiving a first application programming interface (API) call from a scheduler indicating that the scheduler is to execute a thread on the one or more processor cores, the first API call including dispatch latency for a thread; computing a first control effort based on a difference between the dispatch latency for the thread and a target dispatch latency; determining the set of recommended processor cores using the control effort; and communicating the set of recommended processor cores to the scheduler. The set of recommended processor cores can be selected from the one or more processor cores of the one or more processors, where a count of processor cores in the set of recommended processor cores is determined at least in part using the first control effort.

A further embodiment provides for a method including receiving data indicating that the thread includes instructions that are unsupported by one of the one or more processor cores; including within the set of recommended processor cores at least one processor core having support for the instructions of the thread; and receiving a second API call from the scheduler indicating that the scheduler is removing a thread from a processor core of the one or more processor cores. A further embodiment provides for a method including communicating an estimate of energy consumed by the processor core while executing the thread in response to the second API call.

In one embodiment at least one of the one or more processor cores has a higher performance relative to at least one other processor core of the one or more processor cores. In such embodiment, during the second API call, the method additionally includes indicating to the scheduler whether the thread is eligible to be scheduled on the at least one processor core having the higher performance. The first API call can additionally indicate a quality of service (QoS) classification of the thread and whether the thread is eligible to be scheduled on the at least one processor core having the higher performance can be determined at least in part on the QoS classification of the thread.

In one embodiment the method additionally includes computing a second control effort based on processor utilization metric received from a set of processor cores and determining a maximum of the first and second control effort. The maximum of the first and second control effort can be used to determine a count of processor cores in the set of recommended processor cores based on mapping between the maximum of the first and second control effort and a recommended count of processor cores.

In various embodiments, a system including one or more electronic computing devices or data processing systems can be configured to perform particular operations or actions by virtue of having software, firmware, hardware, or a combination of such installed on the system. The software, firmware, and/or hardware cause the system to perform the specified actions. In one embodiment, the system includes one or more processors including one or more processor cores, a scheduler to execute on at least one of the one or more processors, and performance control logic. The scheduler is to schedule a thread for execution on a processor core of the one or more processors. The performance control logic is to compute a first control effort based on a dispatch latency received from the scheduler. Based on the control effort, the performance control logic is further to determine a set of recommended processor cores and communicate the set of recommended processor cores to the scheduler. Other embodiments include corresponding computer systems, apparatus, and computer programs recorded on one or more computer storage devices, each configured to perform the actions of the methods.

In one embodiment, the system can be configured such that the performance control logic is to determine the first control effort based on historical analysis of a control error, where the control error is determined by a difference between the dispatch latency and target dispatch latency. In one embodiment, the performance control logic is configured to determine a count of processor cores in the set of recommended processor cores based on a mapping between control effort and count of recommended processor cores. In one embodiment, the performance control logic is further to compute a second control effort based a processor performance metric received from the one or more processors. In one embodiment, the performance control logic is further configured to store multiple instances of the processor performance metric and compute the second control effort based on the processor performance metric, the processor performance metric including a single thread utilization metric for the one or more processors. In one embodiment, the performance control logic is further configured to determine a maximum of the first and second control effort and determine the set of recommended processor cores based on a mapping between control effort and recommended cores.

In one embodiment, the scheduler is further configured to signal a context switch event to the performance control logic to indicate that the scheduler is preparing to take an action on at least one of the one or more processor cores. In one embodiment, the scheduler is to signal an on-core context switch event to indicate to the performance control logic that the scheduler is to schedule a thread on at least one processor core and, during the on-core context switch event, the scheduler is to transmit data including the dispatch latency and a quality of service (QoS) class for the thread. In one embodiment, the scheduler is to signal an off-core context switch event to indicate to the performance control logic that the scheduler is to remove a thread from at least one processor core and, during the on-core context switch event, the performance control logic is to transmit data including the set of recommended processor cores and an estimate of energy consumed by the at least one processor core while executing the thread.

In one embodiment, the one or more processor cores of the system include a first set of processor cores and a second set of processor cores, the first set of processor cores having higher performance relative to the second set of processor cores and the second set of processor cores having reduced energy consumption relative to the first set of processor cores. In one embodiment, the on-core context switch event is further to indicate whether the thread includes instructions that are unsupported by one of the first or second set of processor cores. In one embodiment, the set of recommended processor cores includes at least one processor core in the first set of processor cores and the off-core context switch event is further to indicate whether the thread is eligible for subsequent execution on the at least one processor in the first set of processor cores.

In one embodiment, the performance control logic is further to configure a power and efficiency state of the one or more processors based on the set of recommended processor cores. In one embodiment, the performance control logic is further to configure an interrupt mask to enable external interrupts on the set of recommended processor cores. In one embodiment, the performance control logic is further to configure the interrupt mask to disable external interrupts on a processor core when a processor core is removed from the set of recommended processor cores.

In one embodiment, a non-transitory machine-readable medium stores instructions which, when executed by one or more processors including one or more processor cores, cause the one or more processors to perform operations to determine a set of recommended processor cores. In various embodiments, the operations comprise receiving a first application programming interface (API) call from a scheduler indicating that the scheduler is to execute a thread on the one or more processor cores, the first API call including dispatch latency for a thread. The operations further comprise computing a first control effort based on a difference between the dispatch latency for the thread and a target dispatch latency and determining the set of recommended processor cores using the control effort. The set of recommended processor cores can be selected from the one or more processor cores of the one or more processors, where a count of processor cores in the set of recommended processor cores is determined at least in part using the first control effort.

In one embodiment the instructions of the non-transitory machine-readable medium causes the one or more processors to perform further operations including receiving data indicating that the thread includes instructions that are unsupported by one of the one or more processor cores and including within the set of recommended processor cores at least one processor core having support for the instructions of the thread. The operations can additionally include receiving a second API call from the scheduler indicating that the scheduler is removing a thread from a processor core of the one or more processor cores. The operations can further include communicating an estimate of energy consumed by the processor core while executing the thread in response to the second API call.

In one embodiment at least one of the one or more processor cores has a higher performance relative to at least one other processor core of the one or more processor cores. In such embodiment, during the second API call, the operations include indicating to the scheduler whether the thread is eligible to be scheduled on the at least one processor core having the higher performance. The first API call can additionally indicate a quality of service (QoS) classification of the thread and whether the thread is eligible to be scheduled on the at least one processor core having higher performance can be determined at least in part on the QoS classification of the thread.

In one embodiment the operations additionally include computing a second control effort based on processor utilization metric received from a set of processor cores and determining a maximum of the first and second control effort. The maximum of the first and second control effort can be used to determine a count of processor cores in the set of recommended processor cores based on mapping between the maximum of the first and second control effort and a recommended count of processor cores.

In one embodiment, an electronic device includes one or more processors having a first and second set of processor cores. The electronic device can include a scheduler to execute on the one or more processors, where the scheduler is configured to cause a thread to execute on a processor core in the first or second set of processor cores. The electronic device can also include performance control logic to configure a power and performance state of the one or more processors and further to compute a first control effort based on a dispatch latency received from the scheduler, compute a second control effort based a processor performance metric received from the one or more processors, determine a set of recommended processor cores based on the first and second control effort, and communicate the set of recommended processor cores to the scheduler.

In one embodiment, the first set of processor cores of the device have a higher performance relative to the second set of processor cores, while the second set of processor cores have reduced energy consumption relative to the first set of processor cores. In such embodiment, the performance control logic can receive dispatch latency for a thread from the scheduler when the scheduler is prepared to schedule a thread for execution on a processor core in the first or second set of processor cores and communicate an energy estimate for processor activity caused by the thread when the scheduler removes the thread from the processor core.

In one embodiment, the performance control logic is to receive a quality of service (QoS) classification of the thread from the scheduler and indicate to the scheduler whether the thread is eligible to be scheduled on the first set of processor cores. Whether the thread is eligible to be scheduled on the first set of processor cores can be determined at least in part on the QoS classification of the thread.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
receiving a first application programming interface (API) call from a scheduler indicating that the scheduler is to execute a thread on one or more processor cores, the first API call including a dispatch latency for a thread;
computing a first control effort based on a difference between the dispatch latency for the thread and a target dispatch latency;
determining a set of recommended processor cores selected from the one or more processor cores of the one or more processors, wherein a count of processor cores in the set of recommended processor cores is determined at least in part using the first control effort; and
communicating the set of recommended processor cores to the scheduler.

2. The method as in claim 1, further comprising:
receiving data indicating that the thread includes instructions that are unsupported by one of the one or more processor cores; and
including within the set of recommended processor cores at least one processor core having support for the instructions of the thread.

3. The method as in claim 2, further comprising:
receiving a second API call from the scheduler indicating that the scheduler is removing a thread from a processor core of the one or more processor cores; and
communicating an estimate of energy consumed by the processor core while executing the thread.

4. The method as in claim 3, wherein at least one of the one or more processor cores has a higher performance relative to at least one other processor core of the one or more processor cores and during the second API call indicating to the scheduler whether the thread is eligible to be scheduled on the at least one processor core having the higher performance.

5. The method as in claim 4, wherein the first API call additionally indicates a quality of service (QoS) classification of the thread and whether the thread is eligible to be scheduled on the at least one processor core having the higher performance is determined at least in part on the QoS classification of the thread.

6. The method as in claim 5, further comprising:
computing a second control effort based on a processor utilization metric received from a set of processor cores;
determining a maximum of the first and second control effort; and
determining the count of processor cores in the set of recommended processor cores based on mapping between the maximum of the first and second control effort and a recommended count of processor cores.

7. A system comprising:
one or more processors including one or more processor cores;
a scheduler to execute on at least one of the one or more processors, the scheduler to schedule a thread for execution on a processor core of the one or more processors; and
performance control logic to compute a first control effort based on a difference between a dispatch latency received from a first application programming interface (API) call from the scheduler and a target dispatch latency, determine a set of recommended processor cores selected from the one or more processor cores of the one or more processors based on the first control effort, and communicate the set of recommended processor cores to the scheduler.

8. The system as in claim 7, wherein the performance control logic is to determine the first control effort based on historical analysis of a control error, the control error determined by a difference between the dispatch latency and a target dispatch latency.

9. The system as in claim 7, wherein the performance control logic is to determine a count of processor cores in the set of recommended processor cores based on a mapping between control effort and count of recommended processor cores.

10. The system as in claim 7, wherein the performance control logic is further to compute a second control effort based on a processor performance metric received from the one or more processors.

11. The system as in claim 10, wherein the performance control logic is further to store multiple instances of the processor performance metric and compute the second control effort based on the processor performance metric, the processor performance metric including a single thread utilization metric for the one or more processors.

12. The system as in claim 11, wherein the performance control logic is further to determine a maximum of the first and second control effort and determine the set of recommended processor cores based on a mapping between control effort and recommended cores.

13. The system as in claim 7, wherein the scheduler is further to signal a context switch event to the performance control logic to indicate that the scheduler is to take an action on at least one of the one or more processor cores.

14. The system as in claim 13, wherein the scheduler is to signal an on-core context switch event to indicate to the performance control logic that the scheduler is to schedule a thread on at least one processor core and, during the on-core context switch event, the scheduler is to transmit data including the dispatch latency and a quality of service (QoS) class for the thread.

15. The system as in claim 14, wherein the scheduler is to signal an off-core context switch event to indicate to the performance control logic that the scheduler is to remove a thread from at least one processor core and, during the on-core context switch event, the performance control logic is to transmit data including the set of recommended processor cores and an estimate of energy consumed by the at least one processor core while executing the thread.

16. The system as in claim 15, wherein the one or more processor cores include a first set of processor cores and a second set of processor cores, the first set of processor cores having higher performance relative to the second set of processor cores and the second set of processor cores having reduced energy consumption relative to the first set of processor cores.

17. The system as in claim 16, wherein the on-core context switch event is further to indicate whether the thread includes instructions that are unsupported by one of the first or second set of processor cores.

18. The system as in claim 17, wherein the set of recommended processor cores includes at least one processor core in the first set of processor cores and the off-core context switch event is further to indicate whether the thread is eligible for subsequent execution on the at least one processor in the first set of processor cores.

19. The system as in claim 18, wherein the performance control logic is further to configure a power and efficiency state of the one or more processors based on the set of recommended processor cores.

20. The system as in claim 18, wherein the performance control logic is further to configure an interrupt mask to enable external interrupts on the set of recommended processor cores.

21. The system as in claim 20, wherein the performance control logic is further to configure the interrupt mask to disable external interrupts on a processor core when a processor core is removed from the set of recommended processor cores.

22. A non-transitory machine-readable medium storing instructions which, when executed by one or more processors including one or more processor cores, cause the one or more processors to perform operations to determine a set of recommended processor cores, the operations comprising:
  receiving a first application programming interface (API) call from a scheduler indicating that the scheduler is to execute a thread on the one or more processor cores, the first API call including a dispatch latency for a thread;
  computing a first control effort based on a difference between the dispatch latency for the thread and a target dispatch latency;
  determining the set of recommended processor cores, the recommended processor cores selected from the one or more processor cores of the one or more processors, wherein a count of processor cores in the set of recommended processor cores is determined at least in part using the first control effort; and
  communicating the set of recommended processor cores to the scheduler.

23. The medium as in claim 22, wherein the operations further comprise:
  receiving data indicating that the thread includes instructions that are unsupported by one of the one or more processor cores; and
  including within the set of recommended processor cores at least one processor core having support for the instructions of the thread.

24. The medium as in claim 23, wherein the operations further comprise:
  receiving a second API call from the scheduler indicating that the scheduler is removing a thread from a processor core of the one or more processor cores; and
  communicating an estimate of energy consumed by the processor core while executing the thread.

25. The medium as in claim 24, wherein at least one of the one or more processor cores has a higher performance relative to at least one other processor core of the one or more processor cores and during the second API call indicating to the scheduler whether the thread is eligible to be scheduled on the at least one processor core having the higher performance.

26. The medium as in claim 25, wherein the first API call additionally indicates a quality of service (QoS) classification of the thread and whether the thread is eligible to be scheduled on the at least one processor core having the higher performance is determined at least in part on the QoS classification of the thread.

27. The medium as in claim 26, wherein the operations further comprise:
  computing a second control effort based on a processor utilization metric received from a set of processor cores;
  determining a maximum of the first and second control effort; and
  determining the count of processor cores in the set of recommended processor cores based on mapping between the maximum of the first and second control effort and a recommended count of processor cores.

28. An electronic device comprising:
  one or more processors having a first and second set of processor cores;
  a scheduler to execute on the one or more processors, the scheduler to cause a thread to execute on a processor core in the first or second set of processor cores; and
  performance control logic to compute a first control effort based on a difference between a dispatch latency received from a first application programming interface (API) call from the scheduler and a target dispatch latency, compute a second control effort based on a processor performance metric received from the one or more processors, determine a set of recommended processor cores selected from the one or more processor cores of the one or more processors based on the first and second control effort, and communicate the set of recommended processor cores to the scheduler.

29. The device as in claim 28, wherein the first set of processor cores have a higher performance relative to the second set of processor cores and the second set of processor cores have reduced energy consumption relative to the first set of processor cores.

30. The device as in claim 29, wherein the performance control logic is to receive a dispatch latency for a thread from the scheduler and communicate an energy estimate for processor activity caused by the thread.

31. The device as in claim 30, wherein the performance control logic is to receive a quality of service (QoS) classification of the thread from the scheduler and indicate to the scheduler whether the thread is eligible to be scheduled on the first set of processor cores, wherein the thread is determined to be eligible at least in part on the QoS classification of the thread.

32. A non-transitory machine-readable medium storing instructions which, when executed by a data processing system, cause the data processing system to perform a method comprising:
  receiving a first application programming interface (API) call from a scheduler indicating that the scheduler is to execute a thread on a set of microprocessor devices, the first API call including a dispatch latency for a thread;
  computing a first control value based on a difference between the dispatch latency for the thread and a target dispatch latency;
  determining a set of recommended microprocessor devices, the set of recommended microprocessor devices selected from the set of microprocessor devices, wherein a count of microprocessor devices in the set of recommended microprocessor devices is determined at least in part using the first control value; and
  communicating the set of recommended microprocessor devices to the scheduler.

33. The medium as in claim 32, wherein the method further comprises:
receiving data indicating that the thread includes instructions that are unsupported by one of the microprocessor devices in the set of microprocessor devices; and
including within the set of recommended microprocessor devices at least one microprocessor device having support for the instructions of the thread.

34. The medium as in claim 33, wherein the method further comprises:
receiving a second API call from the scheduler indicating that the scheduler is removing a thread from a microprocessor device in the set of microprocessor devices; and
communicating an estimate of energy consumed by the microprocessor device while executing the thread.

35. The medium as in claim 33, wherein the method further comprises:
receiving a second API call from a scheduler indicating that the scheduler is removing a thread from a microprocessor device in the set of microprocessor devices and wherein the first API call is from the scheduler; and
communicating an estimate of energy consumed by the microprocessor device while executing the thread.

36. The medium as in claim 32, wherein the set of microprocessor devices is an asymmetric multiprocessing system in which a first microprocessor device differs from a second microprocessor device.

37. The medium as in claim 36, wherein the first API call additionally indicates a quality of service (QoS) classification of the thread and whether the thread is eligible to be scheduled on a microprocessor device having higher performance is determined at least in part on the QoS classification of the thread.

38. The medium as in claim 37, wherein the method further comprises:
computing a second control value based on a processor utilization metric received from the set of microprocessor devices;
determining a maximum of the first and second control values; and
determining the count based on mapping between the maximum of the first and second control values and a recommended count of microprocessor devices.

39. The medium as in claim 37, wherein the method further comprises:
computing a second control value based on a processor utilization metric received from the set of microprocessor devices;
determining a maximum of the first and second control values; and
determining the count based on mapping between the maximum of the first and second control values and a recommended count of microprocessor devices.

40. The medium as in claim 36, wherein the first API call additionally indicates a quality of service (QoS) classification of the thread and whether the thread is eligible to be scheduled on a microprocessor device having higher performance is determined at least in part on the QoS classification of the thread.

41. The medium as in claim 32, wherein the method further comprises:
receiving data indicating that the thread includes instructions that are unsupported by one of the microprocessor devices in the set of microprocessor devices; and
including within the set of recommended microprocessor devices at least one microprocessor device having support for the instructions of the thread.

42. The medium as in claim 32, wherein the set of microprocessor devices is an asymmetric multiprocessing system in which a first microprocessor device differs from a second microprocessor device.

43. A non-transitory machine-readable medium storing instructions which, when executed by a data processing system, cause the data processing system to perform a method comprising:
receiving a first application programming interface (API) call in connection with executing a thread on a set of microprocessor devices, the first API call including a dispatch latency for a thread;
computing a first control value based on a difference between the dispatch latency for the thread and a target dispatch latency;
determining a set of recommended microprocessor devices, the set of recommended microprocessor devices selected from the set of microprocessor devices, wherein a count of microprocessor devices in the set of recommended microprocessor devices is determined at least in part using the first control value; and
communicating the set of recommended microprocessor devices based on the determined set of recommended set of microprocessor devices.

* * * * *